United States Patent
Dykema et al.

(10) Patent No.: US 12,450,193 B2
(45) Date of Patent: Oct. 21, 2025

(54) SYSTEM OF HETEROGENEOUS RECONFIGURABLE PROCESSORS FOR THE DATA-PARALLEL EXECUTION OF APPLICATIONS

(71) Applicant: SambaNova Systems, Inc., Palo Alto, CA (US)

(72) Inventors: Greg Dykema, Palo Alto, CA (US); Maran Wilson, Palo Alto, CA (US); Guoyao Feng, Palo Alto, CA (US); Kuan Zhou, Palo Alto, CA (US); Tianyu Sun, Palo Alto, CA (US); Taylor Lee, Palo Alto, CA (US); Kin Hing Leung, Cupertino, CA (US); Arnav Goel, San Jose, CA (US); Conrad Turlik, Menlo Park, CA (US); Milad Sharif, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 460 days.

(21) Appl. No.: 17/941,947

(22) Filed: Sep. 9, 2022

(65) Prior Publication Data

US 2023/0237013 A1 Jul. 27, 2023

Related U.S. Application Data

(60) Provisional application No. 63/303,913, filed on Jan. 27, 2022, provisional application No. 63/303,901, filed on Jan. 27, 2022.

(51) Int. Cl.
*G06F 15/80* (2006.01)
*G06F 8/41* (2018.01)
*G06F 15/78* (2006.01)

(52) U.S. Cl.
CPC .......... *G06F 15/8038* (2013.01); *G06F 8/443* (2013.01); *G06F 8/447* (2013.01);
(Continued)

(58) Field of Classification Search
CPC . G06F 8/443; G06F 8/447; G06F 8/45; G06F 15/8038; G06F 15/7867; G06F 15/80; G06F 9/445; G06F 9/5061
(Continued)

(56) References Cited

U.S. PATENT DOCUMENTS 9,727,460 B2    8/2017  Choi et al.
2008/0120493 A1  5/2008  Yoo et al.
(Continued)

FOREIGN PATENT DOCUMENTS

WO    2010142987 A1    12/2010

OTHER PUBLICATIONS

T. Stripf et al., "A flexible approach for compiling scilab to reconfigurable multi-core embedded systems," 7th International Workshop on Reconfigurable and Communication-Centric Systems-on-Chip (ReCoSoC), York, UK, 2012, pp. 1-8. (Year: 2012).*
(Continued)

*Primary Examiner* — Andrew M. Lyons
(74) *Attorney, Agent, or Firm* — Flagship Patents; Sikander M. Khan; Joachim Erhard Pistorius

(57) ABSTRACT

A system for a data-parallel execution of at least two implementations of an application on reconfigurable processors with different layouts is presented. The system comprises a pool of reconfigurable data flow resources with data transfer resources that interconnect first and second reconfigurable processors having first and second layouts that impose respective first and second constraints for the data-parallel execution of the application. The system further comprises an archive of configuration files and a host system
(Continued)

that is operatively coupled to the first and second reconfigurable processors. The host system comprises first and second compilers that generate for the application, based on the respective first and second constraints, first and second configuration files that are stored in the archive of configuration files and adapted to be executed data-parallel compatible on respective first and second reconfigurable processors.

25 Claims, 11 Drawing Sheets

(52) U.S. Cl.
CPC ............ *G06F 8/45* (2013.01); *G06F 15/7867* (2013.01); *G06F 15/80* (2013.01)

(58) Field of Classification Search
USPC .......................................................... 717/151
See application file for complete search history.

(56) References Cited

U.S. PATENT DOCUMENTS

| | | | |
|---|---|---|---|
| 2009/0070552 A1 | 3/2009 | Kanstein et al. | |
| 2013/0047155 A1* | 2/2013 | Caspole ................. | G06F 9/445 718/104 |
| 2013/0246735 A1 | 9/2013 | Park et al. | |
| 2014/0019726 A1* | 1/2014 | Toi ........................ | G06F 30/327 712/221 |
| 2014/0068582 A1* | 3/2014 | Chen ...................... | G06F 8/451 717/149 |
| 2016/0070549 A1* | 3/2016 | Hall ......................... | G06F 8/71 717/140 |
| 2017/0131985 A1* | 5/2017 | Kanda et al. ............ | G06F 8/443 |
| 2017/0212739 A1* | 7/2017 | Catiller ............... | G06F 15/7889 |
| 2019/0095383 A1 | 3/2019 | Fleming et al. | |
| 2020/0012618 A1* | 1/2020 | Parandeh Afshar ........................ | G06F 15/8092 |
| 2020/0167309 A1 | 5/2020 | Nicol | |
| 2020/0174840 A1* | 6/2020 | Zhao et al. ........... | G06F 9/5061 |
| 2020/0257643 A1 | 8/2020 | Grohoski et al. | |
| 2020/0341930 A1* | 10/2020 | Cannata et al. ........ | G06F 9/451 |
| 2020/0356523 A1 | 11/2020 | Prabhakar et al. | |
| 2021/0011770 A1 | 1/2021 | Prabhakar et al. | |
| 2022/0075651 A1* | 3/2022 | Harboe ................... | G06F 8/445 |
| 2023/0237013 A1 | 7/2023 | Dykema et al. | |

OTHER PUBLICATIONS

F. Thoma et al., "MORPHEUS: Heterogeneous Reconfigurable Computing," 2007 International Conference on Field Programmable Logic and Applications, Amsterdam, Netherlands, 2007, pp. 409-414. (Year: 2007).*

Koeplinger et al., Spatial: A Language and Compiler for Application Accelerators, PLDI '18, Jun. 18-22, 2018, Association for Computng Machinery, 16 pages.

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al., A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

U.S. Appl. No. 17/941,986, Notice of Allowance, filed Jan. 19, 2024, 7 pages.

* cited by examiner

SYSTEM OF HETEROGENEOUS RECONFIGURABLE PROCESSORS FOR THE DATA-PARALLEL EXECUTION OF APPLICATIONS

RELATED APPLICATIONS AND DOCUMENTS

This application is jointly filed with non-provisional application "A System for Executing an Application on Heterogeneous Reconfigurable Processors". This application further claims the benefit of U.S. Provisional Patent Application No. 63/303,901, entitled, "System of Heterogeneous Reconfigurable Processors for the Data-Parallel Execution of Applications" filed on 27 Jan. 2022. This application further claims the benefit of U.S. Provisional Patent Application No. 63/303,913, entitled, "System for Executing an Application on Heterogeneous Reconfigurable Processors" filed on 27 Jan. 2022. The provisional applications are hereby incorporated by reference for all purposes.

This application also is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239,252, filed Jan. 3, 2019, entitled "VIRTUALIZATION OF A RECONFIGURABLE DATA PROCESSOR,";

U.S. Nonprovisional patent application Ser. No. 16/862,445, filed Apr. 29, 2020, entitled "VIRTUALIZATION OF A RECONFIGURABLE DATA PROCESSOR,";

U.S. Nonprovisional patent application Ser. No. 16/197,826, filed Nov. 21, 2018, entitled "CONFIGURATION LOAD OF A RECONFIGURABLE DATA PROCESSOR,";

U.S. Nonprovisional patent application Ser. No. 16/198,086, filed Nov. 21, 2018, entitled "CONFIGURATION UNLOAD OF A RECONFIGURABLE DATA PROCESSOR,";

U.S. Nonprovisional patent application Ser. No. 17/093,543, filed Nov. 9, 2020, entitled "EFFICIENT CONFIGURATION OF A RECONFIGURABLE DATA PROCESSOR,";

U.S. Nonprovisional patent application Ser. No. 16/260,548, filed Jan. 29, 2019, entitled "MATRIX NORMAL/TRANSPOSE READ AND A RECONFIGURABLE DATA PROCESSOR INCLUDING SAME,";

U.S. Nonprovisional patent application Ser. No. 16/536,192, filed Aug. 8, 2019, entitled "COMPILER FLOW LOGIC FOR RECONFIGURABLE ARCHITECTURES,";

U.S. Nonprovisional patent application Ser. No. 17/326,128, filed May 20, 2021, entitled "COMPILER FLOW LOGIC FOR RECONFIGURABLE ARCHITECTURES,";

U.S. Nonprovisional patent application Ser. No. 16/407,675, filed May 9, 2019, entitled "CONTROL FLOW BARRIER AND RECONFIGURABLE DATA PROCESSOR,";

U.S. Nonprovisional patent application Ser. No. 16/504,627, filed Jul. 8, 2019, entitled "QUIESCE RECONFIGURABLE DATA PROCESSOR,";

U.S. Nonprovisional patent application Ser. No. 17/322,697, filed May 17, 2021, entitled "QUIESCE RECONFIGURABLE DATA PROCESSOR,";

U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION,";

U.S. Nonprovisional patent application Ser. No. 16/744,077, filed Jan. 15, 2020, entitled "COMPUTATIONALLY EFFICIENT SOFTMAX LOSS GRADIENT BACKPROPAGATION,";

U.S. Nonprovisional patent application Ser. No. 16/590,058, filed Oct. 1, 2019, entitled "COMPUTATION UNITS FOR FUNCTIONS BASED ON LOOKUP TABLES,";

U.S. Nonprovisional patent application Ser. No. 16/695,138, filed Nov. 25, 2019, entitled "COMPUTATIONAL UNITS FOR BATCH NORMALIZATION,";

U.S. Nonprovisional patent application Ser. No. 16/688,069, filed Nov. 19, 2019, entitled "LOOK-UP TABLE WITH INPUT OFFSETTING,";

U.S. Nonprovisional patent application Ser. No. 16/718,094, filed Dec. 17, 2019, entitled "COMPUTATIONAL UNITS FOR ELEMENT APPROXIMATION,";

U.S. Nonprovisional patent application Ser. No. 16/560,057, filed Sep. 4, 2019, entitled "SIGMOID FUNCTION IN HARDWARE AND A RECONFIGURABLE DATA PROCESSOR INCLUDING SAME,";

U.S. Nonprovisional patent application Ser. No. 16/572,527, filed Sep. 16, 2019, entitled "Performance Estimation-Based Resource Allocation for Reconfigurable Architectures,";

U.S. Nonprovisional patent application Ser. No. 15/930,381, filed May 12, 2020, entitled "COMPUTATIONALLY EFFICIENT GENERAL MATRIX-MATRIX MULTIPLICATION (GEMM),";

U.S. Nonprovisional patent application Ser. No. 17/337,080, filed Jun. 2, 2021, entitled "MEMORY EFFICIENT DROPOUT,";

U.S. Nonprovisional patent application Ser. No. 17/337,126, filed Jun. 2, 2021, entitled "MEMORY EFFICIENT DROPOUT, WITH REORDERING OF DROPOUT MASK ELEMENTS,";

U.S. Nonprovisional patent application Ser. No. 16/890,841, filed Jun. 2, 2020, entitled "ANTI-CONGESTION FLOW CONTROL FOR RECONFIGURABLE PROCESSORS,";

U.S. Nonprovisional patent application Ser. No. 17/023,015, filed Sep. 16, 2020, entitled "COMPILE TIME LOGIC FOR DETECTING STREAMING COMPATIBLE AND BROADCAST COMPATIBLE DATA ACCESS PATTERNS,";

U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION,";

U.S. Nonprovisional patent application Ser. No. 17/175,289, filed Feb. 12, 2021, entitled "INSTRUMENTATION PROFILING FOR RECONFIGURABLE PROCESSORS,";

U.S. Nonprovisional patent application Ser. No. 17/371,049, filed Jul. 8, 2021, entitled "SYSTEMS AND METHODS FOR EDITING TOPOLOGY OF A RECONFIGURABLE DATA PROCESSOR,";

U.S. Nonprovisional patent application Ser. No. 16/922,975, filed Jul. 7, 2020, entitled "RUNTIME VIRTUALIZATION OF RECONFIGURABLE DATA FLOW RESOURCES,";

U.S. Nonprovisional patent application Ser. No. 16/996,666, filed Aug. 18, 2020, entitled "RUNTIME PATCHING OF CONFIGURATION FILES,";

U.S. Nonprovisional patent application Ser. No. 17/214,768, filed Mar. 26, 2021, entitled "RESOURCE ALLOCATION FOR RECONFIGURABLE PROCESSORS,";

U.S. Nonprovisional patent application Ser. No. 17/127,818, filed Dec. 18, 2020, entitled "INTRA-NODE BUFFER-BASED STREAMING FOR RECONFIGURABLE PROCESSOR-AS-A-SERVICE (RPAAS),";

U.S. Nonprovisional patent application Ser. No. 17/127,929, filed Dec. 18, 2020, entitled "INTER-NODE BUFFER-BASED STREAMING FOR RECONFIGURABLE PROCESSOR-AS-A-SERVICE (RPAAS),";

U.S. Nonprovisional patent application Ser. No. 17/185,264, filed Feb. 25, 2021, entitled "TIME-MULTIPLEXED USE OF RECONFIGURABLE HARDWARE,";

U.S. Nonprovisional patent application Ser. No. 17/216,647, filed Mar. 29, 2021, entitled "TENSOR PARTITIONING AND PARTITION ACCESS ORDER,";

U.S. Nonprovisional patent application Ser. No. 17/216,650, filed Mar. 29, 2021, entitled "MULTI-HEADED MULTI-BUFFER FOR BUFFERING DATA FOR PROCESSING,";

U.S. Nonprovisional patent application Ser. No. 17/216,657, filed Mar. 29, 2021, entitled "LOSSLESS TILING IN CONVOLUTION NETWORKS—PADDING BEFORE TILING, LOCATION-BASED TILING, AND ZEROING-OUT,";

U.S. Nonprovisional patent application Ser. No. 17/384,515, filed Jul. 23, 2021, entitled "LOSSLESS TILING IN CONVOLUTION NETWORKS—MATERIALIZATION OF TENSORS,";

U.S. Nonprovisional patent application Ser. No. 17/216,651, filed Mar. 29, 2021, entitled "LOSSLESS TILING IN CONVOLUTION NETWORKS—TILING CONFIGURATION,";

U.S. Nonprovisional patent application Ser. No. 17/216,652, filed Mar. 29, 2021, entitled "LOSSLESS TILING IN CONVOLUTION NETWORKS—SECTION BOUNDARIES,";

U.S. Nonprovisional patent application Ser. No. 17/216,654, filed Mar. 29, 2021, entitled "LOSSLESS TILING IN CONVOLUTION NETWORKS—READ-MODIFY-WRITE IN BACKWARD PASS,";

U.S. Nonprovisional patent application Ser. No. 17/216,655, filed Mar. 29, 2021, entitled "LOSSLESS TILING IN CONVOLUTION NETWORKS—WEIGHT GRADIENT CALCULATION,";

U.S. Nonprovisional patent application Ser. No. 17/364,110, filed Jun. 30, 2021, entitled "LOSSLESS TILING IN CONVOLUTION NETWORKS—TILING CONFIGURATION FOR A SEQUENCE OF SECTIONS OF A GRAPH,";

U.S. Nonprovisional patent application Ser. No. 17/364,129, filed Jun. 30, 2021, entitled "LOSSLESS TILING IN CONVOLUTION NETWORKS—TILING CONFIGURATION BETWEEN TWO SECTIONS,";

U.S. Nonprovisional patent application Ser. No. 17/364,141, filed Jun. 30, 2021, entitled "LOSSLESS TILING IN CONVOLUTION NETWORKS—PADDING AND RE-TILLING AT SECTION BOUNDARIES,"

"U.S. Nonprovisional patent application Ser. No. 17/384,507, filed Jul. 23, 2021, entitled "LOSSLESS TILING IN CONVOLUTION NETWORKS—BACKWARD PASS,";

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP,";

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT,";

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT,";

U.S. Provisional Patent Application No. 63/190,749, filed May 19, 2021, entitled "FLOATING POINT MULTIPLY-ADD, ACCUMULATE UNIT WITH CARRY-SAVE ACCUMULATOR,";

U.S. Provisional Patent Application No. 63/174,460, filed Apr. 13, 2021, entitled "EXCEPTION PROCESSING IN CARRY-SAVE ACCUMULATION UNIT FOR MACHINE LEARNING,";

U.S. Nonprovisional patent application Ser. No. 17/397,241, filed Aug. 9, 2021, entitled "FLOATING POINT MULTIPLY-ADD, ACCUMULATE UNIT WITH CARRY-SAVE ACCUMULATOR,";

U.S. Nonprovisional patent application Ser. No. 17/216,509, filed Mar. 29, 2021, entitled "UNIVERSAL RAIL KIT,";

U.S. Nonprovisional patent application Ser. No. 17/379,921, filed Jul. 19, 2021, entitled "DATAFLOW FUNCTION OFFLOAD TO RECONFIGURABLE PROCESSORS,";

U.S. Nonprovisional patent application Ser. No. 17/379,924, filed Jul. 19, 2021, entitled "DATAFLOW ALL-REDUCE FOR RECONFIGURABLE PROCESSOR SYSTEMS,";

U.S. Nonprovisional patent application Ser. No. 17/378,342, filed Jul. 16, 2021, entitled "DEFECT REPAIR FOR A RECONFIGURABLE DATA PROCESSOR,";

U.S. Nonprovisional patent application Ser. No. 17/378,391, filed Jul. 16, 2021, entitled "DEFECT REPAIR CIRCUITS FOR A RECONFIGURABLE DATA PROCESSOR,";

U.S. Nonprovisional patent application Ser. No. 17/378,399, filed Jul. 16, 2021, entitled "ROUTING CIRCUITS FOR DEFECT REPAIR FOR A RECONFIGURABLE DATA PROCESSOR,";

U.S. Provisional Patent Application No. 63/220,266, filed Jul. 9, 2021, entitled "LOGIC BIST AND FUNCTIONAL TEST FOR A CGRA,";

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM,";

U.S. Nonprovisional patent application Ser. No. 17/338,620, filed Jun. 3, 2021, entitled "VARIABLE-LENGTH CLOCK STRETCHER WITH CORRECTION FOR GLITCHES DUE TO FINITE DLL BANDWIDTH,";

U.S. Nonprovisional patent application Ser. No. 17/338,625, filed Jun. 3, 2021, entitled "VARIABLE-LENGTH CLOCK STRETCHER WITH CORRECTION FOR GLITCHES DUE TO PHASE DETECTOR OFFSET,";

U.S. Nonprovisional patent application Ser. No. 17/338,626, filed Jun. 3, 2021, entitled "VARIABLE-LENGTH CLOCK STRETCHER WITH CORRECTION FOR DIGITAL DLL GLITCHES,";

U.S. Nonprovisional patent application Ser. No. 17/338,629, filed Jun. 3, 2021, entitled "VARIABLE-LENGTH CLOCK STRETCHER WITH PASSIVE MODE JITTER REDUCTION,";

U.S. Nonprovisional patent application Ser. No. 17/405,913, filed Aug. 18, 2021, entitled "VARIABLE-LENGTH CLOCK STRETCHER WITH COMBINER TIMING LOGIC,";

U.S. Provisional Patent Application No. 63/230,782, filed Aug. 8, 2021, entitled "LOW-LATENCY MASTER-SLAVE CLOCKED STORAGE ELEMENT,";

U.S. Provisional Patent Application No. 63/236,218, filed Aug. 23, 2021, entitled "SWITCH FOR A RECONFIGURABLE DATAFLOW PROCESSOR,";

U.S. Provisional Patent Application No. 63/236,214, filed Aug. 23, 2021, entitled "SPARSE MATRIX MULTIPLIER,".

All of the related application(s) and documents listed above are hereby incorporated by reference herein for all purposes.

FIELD OF THE TECHNOLOGY DISCLOSED

The present technology relates to executing an application using a pool of reconfigurable processors, and more particularly to executing an application using a pool of reconfigurable processors that includes first and second pluralities of reconfigurable processors that have respective first and second architectures. Executing an application using such a pool of reconfigurable processors is particularly applicable to cloud offering of coarse-grained reconfigurable architectures (CGRAs).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Dataflow architectures are based on the idea of disconnected computational actors organized into stages that can be pipelined. Dataflow stages execute primarily in response to the availability of all the required operands, and each processing element has some way of knowing when all the operands are available before it can execute (or complete the execution of) the function of that stage. Many kinds of algorithms can be implemented with dataflow processing, such as certain aspects of natural-language processing, recommendation engines, database analytics, scientific applications, SQL data processing and deep learning. The present application focuses on deep learning algorithms as an example, but the concepts discussed herein apply just as well to other types of problems.

Deep learning is a subset of machine learning algorithms that are inspired by the structure and function of the human brain. Most deep learning algorithms involve artificial neural network architectures, in which multiple layers of neurons each receive input from neurons in a prior layer or layers, and in turn influence the neurons in the subsequent layer or layers. Training these neural network models can be computationally extremely demanding. Fortunately, the computations involved in network training often include lengthy sequences that are highly repetitive, and that do not depend on the internal results from other instances of the sequence. Such computations often can be parallelized by running different instances of the sequence on different machines. The algorithms still require partial results to be shared periodically among the instances, so periodic sync-ups are still required as the algorithm proceeds.

Mechanisms for parallelizing neural network training can be divided roughly into two groups: model parallelism and data parallelism. In practice, parallelization mechanisms are sometimes mixed and matched, using a combination of model parallelism and data parallelism.

With model parallelism, the network model is divided up and parts of it are allocated to different machines. In some versions the model is divided longitudinally, such that upstream portions of the model are executed by one machine, which passes its results to another machine that executes downstream portions of the model. In the meantime, the upstream machine can begin processing the next batch of training data through the upstream portions of the model. In other versions of model parallelism, the model may include branches which are later merged downstream. In such versions the different branches could be processed on different machines.

With data parallelism, different instances of the same network model are programmed into different machines. The different instances typically each process different batches of the training data, and the partial results are combined. In particular, parallelizing deep learning applications, especially those based on Stochastic Gradient Decent (SGD), requires periodic sharing of intermediate results among the various nodes operating in parallel. For data parallelization, such intermediate results can include both partially aggregated gradients being shared with those of other worker nodes in order to enable calculation of the fully aggregated gradients, and fully aggregated gradients or updated neural network parameters being returned to the worker nodes.

Reconfigurable processors can be configured to implement a variety of functions. In particular, so-called Coarse-Grained Reconfigurable Architectures (CGRAs) are being developed in which the configurable units in the array are complex and that may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada. Various aspects of some of such CGRAs are described in the above-incorporated patent applications.

A CGRA typically includes an array of reconfigurable units and operate on streams of data and control messages that flow through a sea of these reconfigurable units, sometimes referred to herein as Coarse-Grained Reconfigurable Units (CGRUs). The units can comprise somewhat specialized computational and memory units.

Configurable execution units and stateful elements are physically distributed on chip, and connected together using a programmable interconnect for inter-unit communication and synchronization. Configuration bits program the configurable execution units to construct a custom control and data path for an application. Often, the configurable execution units rely on direct hardware reconfiguration by altering their behavior under control of configuration data loaded from a bit file into registers prior to runtime, and state machines are configured by the bit file contents to implement sequences of operations. Thus, the configurable units are programmed to operate on streams of data and control messages, to produce other data and control messages. This makes such architectures inherently distributed, without a single global program state.

At the same time, virtualization has enabled the efficient scaling and sharing of compute resources in the cloud, adapting to changing user needs at runtime. Users are offered a view of an application service with management of resources hidden from view, or alternatively abstracted development platforms for deploying applications that can adapt to changing needs. The flexibility, scalability, and affordability offered by cloud computing are fundamental to the massively connected compute paradigm of the future.

SUMMARY

A technology is described which enables the execution of an application on Coarse-Grained Reconfigurable Array (CGRA) processors of different types in a pool of such Coarse-Grained Reconfigurable Array processors.

In particular, a system for a data-parallel execution of at least two implementations of an application on reconfigurable processors with different layouts, comprises a pool of reconfigurable data flow resources, an archive of configuration files, and a host system. The pool of reconfigurable data flow resources comprises a first reconfigurable processor having a first layout that imposes first constraints for the data-parallel execution of the application, a second reconfigurable processor having a second layout that imposes second constraints for the data-parallel execution of the application, wherein the first and second layouts are different, and wherein at least a subset of the first and second constraints is different, and data transfer resources that interconnect the first and second reconfigurable processors in the pool of reconfigurable data flow resources and enables the first and second reconfigurable processors to receive and send data between each other. The host system is operatively coupled to the first and second reconfigurable processors and comprises a first compiler that receives the application, generates for the application based on the first constraints a first configuration file, and stores the first configuration file in the archive of configuration files, wherein the first configuration file is adapted to be executed on the first reconfigurable processor and data-parallel compatible with executing the application on the second reconfigurable processor, and a second compiler that receives the application, generates for the application based on the second constraints a second configuration file, and stores the second configuration file in the archive of configuration files, wherein the second configuration file is adapted to be executed on the second reconfigurable processor and data-parallel compatible with executing the application on the first reconfigurable processor.

If desired, the system may further comprise a first runtime processor that is operatively coupled to the first reconfigurable processor and configured to: retrieve the first configuration file from the archive of configuration files, load the first configuration file to the first reconfigurable processor, and start a first execution of the application on the first reconfigurable processor in a first implementation of the application, and a second runtime processor that is operatively coupled to the second reconfigurable processor and configured to: retrieve the second configuration file from the archive of configuration files, load the second configuration file to the second reconfigurable processor, and start a second execution of the application on the second reconfigurable processor in a second implementation of the application.

According to one aspect, the host system may comprise a first host that comprises the first compiler and the first runtime processor; and a second host that comprises the second compiler and the second runtime processor.

Illustratively, the system may comprise a third compiler that receives the application, generates for the application a third configuration file, and stores the third configuration file in the archive of configuration files, wherein the third configuration file includes common code that is adapted to be executed on the first and second reconfigurable processors.

According to one aspect, the first and second compilers may define respective first and second series of synchronization points in the first and second configuration files.

Illustratively, a first execution of the application on the first reconfigurable processor reaches each synchronization point in the first series of synchronization points in an identical order as a second execution of the application on the second reconfigurable processor reaches a corresponding synchronization point in the second series of synchronization points.

By way of example, the first and second reconfigurable processors synchronize compatible data over the data transfer resources only if the first execution of the application on the first reconfigurable processor has reached one of the first series of synchronization points and the second execution of the application on the second reconfigurable processor has reached the corresponding synchronization point in the second series of synchronization points.

According to one aspect, the data transfer resources may include at least one of a peripheral component interconnect express (PCIe) channel, a direct memory access (DMA) channel, a double data rate (DDR) channel, an InfiniBand channel, or an Ethernet channel.

If desired, the application comprises a neural network stochastic gradient descent training application, wherein the first and second compilers generate identical first and second groupings of gradients and store the identical first and second groupings of the gradients in respective first and second contiguous address blocks in the first and second configuration files.

Illustratively, the application comprises a neural network stochastic gradient descent training application and wherein the first and second compilers generate first and second addresses for storing gradients in memory.

According to one aspect, a relative address alignment of the first and second addresses is identical.

By way of example, two neighboring addresses for storing a first and a second of the gradients have a same distance between the neighboring addresses.

If desired, the application comprises a neural network stochastic gradient descent training application, and wherein the first and second reconfigurable processors compute gradients in an identical order.

Moreover, a method of operating a system for a data-parallel execution of an application on first and second reconfigurable processors having different layouts, comprises the operations of receiving the application; retrieving first and second compilation constraints for compiling the application for the first and second reconfigurable processors, respectively; using the first compilation constraints to generate a first configuration file that is adapted to execute the application on the first reconfigurable processor that is data-parallel compatible with executing the application on the second reconfigurable processor; using the second compilation constraints to generate a second configuration file that is adapted to execute the application on the second reconfigurable processor that is data-parallel compatible with executing the application on the first reconfigurable processor; loading the first and second configuration files into the first and second reconfigurable processors, respectively; and starting a data-parallel execution of the application as a first execution on the first reconfigurable processor and as a second execution on the second reconfigurable processor.

Illustratively, the method further comprises storing the first and second configuration files in an archive of configuration files after the first and second configuration files are generated; and retrieving the first and second configuration files from the archive of configuration files before loading the first and second configuration files into the first and second reconfigurable processors, respectively.

By way of example, the method further comprises using a checker to check enforcement of the first and second compilation constraints in the first and second configuration files.

If desired, the method further comprises using a checker to check enforcement of the first compilation constraints during the first execution of the application on the first reconfigurable processor and to check enforcement of the second compilation constraints during the second execution of the application on the second reconfigurable processor.

According to one aspect, the method further comprises generating a third configuration file that includes common code that is adapted to be executed on the first and second reconfigurable processors.

Illustratively, the first and second configuration files include respective first and second series of synchronization points, and wherein the data-parallel execution of the application on the first and second reconfigurable processors reaches respective synchronization points in the first and second series of synchronization points in an identical order.

If desired, the application comprises a neural network stochastic gradient descent training application, and wherein using the first compilation constraints to generate the first configuration file and using the second compilation constraints to generate the second configuration file further comprises generating identical first and second groupings of gradients and store the identical first and second groupings of the gradients in respective first and second contiguous address blocks in the first and second configuration files.

According to one aspect, the application comprises a neural network stochastic gradient descent training application, and wherein using the first compilation constraints to generate a first configuration file and using the second compilation constraints to generate the second configuration file further comprises generating first and second addresses for storing gradients in memory, wherein relative addresses between the first and second addresses are different, and wherein a relative address alignment of the first and second addresses is identical.

Illustratively, two neighboring addresses for storing a first and a second of the gradients have a same distance between the neighboring addresses.

Furthermore, a computer-implemented method for performing data-parallel executions of an application on a reconfigurable computing system that comprises a plurality of reconfigurable processors having at least first and second layouts, the first layout imposing first constraints for the data-parallel execution of the application and the second layout imposing second constraints for the data-parallel execution of the application, wherein the first and second layouts are different, and wherein at least a subset of the first and second constraints is different, and wherein the reconfigurable computing system further comprises a plurality of data transfer resources that interconnects reconfigurable processors in the plurality of reconfigurable processors and enables the reconfigurable processors in the plurality of reconfigurable processors to receive and send data, comprising: compiling the application based on the first constraints into a first configuration file and compiling the application based on the second constraints into a second configuration file, wherein the first configuration file is adapted to be executed on first reconfigurable processors of the plurality of reconfigurable processors having the first layout, and wherein the second configuration file is adapted to be executed on second reconfigurable processors of the plurality of reconfigurable processors having the second layout; using the first and second configuration files to configure the first and second reconfigurable processors, respectively; executing the application on the first reconfigurable processors in a first implementation of the application; and executing the application on the second reconfigurable processors in a second implementation of the application, wherein the first and second implementations of the application are data-parallel compatible.

Illustratively, a host system may store the first and second configuration files in an archive of configuration files and retrieve the first and second configuration files from the archive of configuration files prior to using the first and second configuration files to configure the first and second reconfigurable processors, respectively.

If desired, the computer-implemented method further comprises checking enforcement of the first and second constraints in the first and second configuration files.

Other aspects and advantages of the technology described herein can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
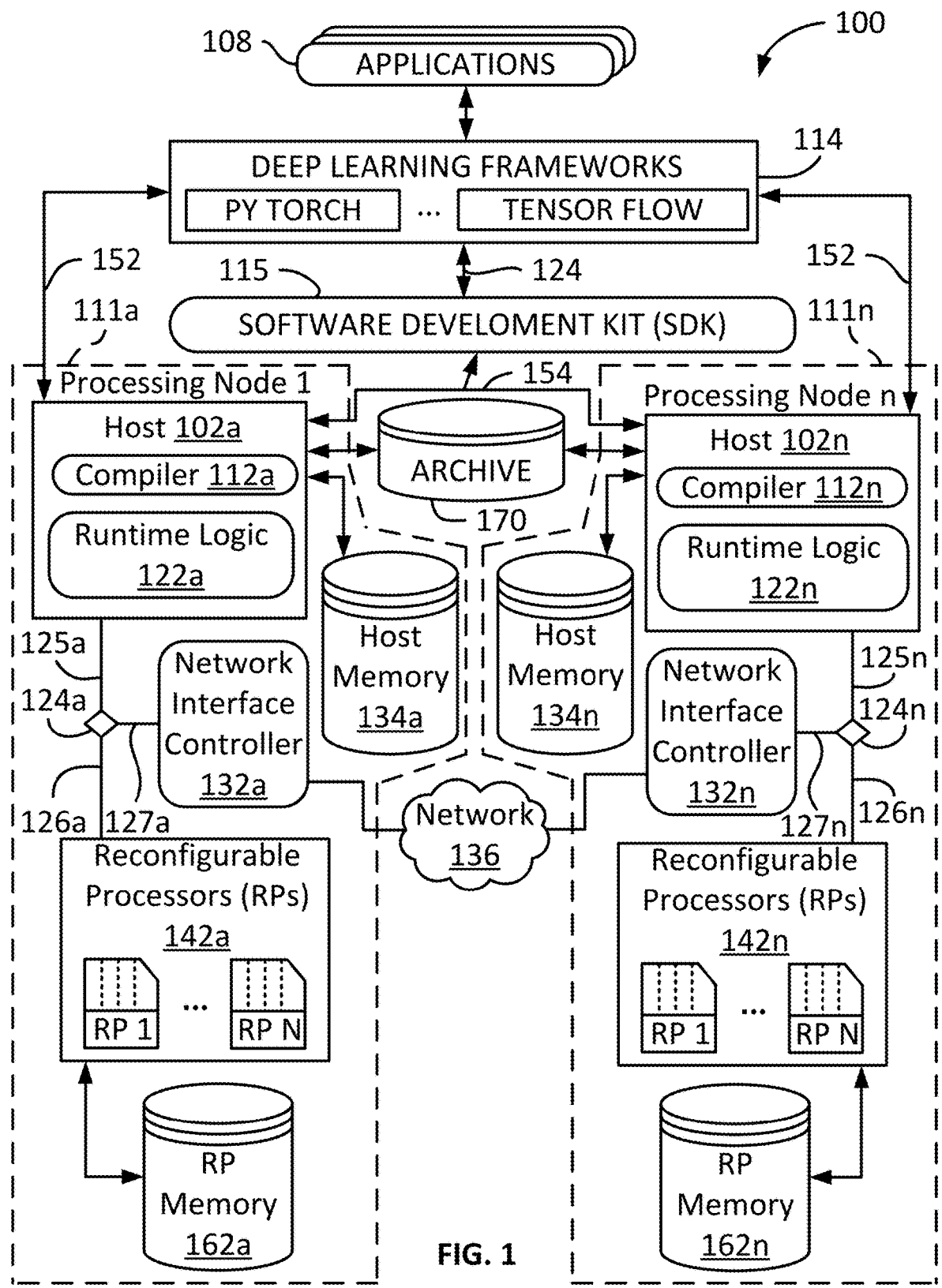
FIG. 1 is a diagram of an illustrative system for a data-parallel execution of at least two implementations of an application on reconfigurable processors with different layouts using first and second processing nodes in accordance with the disclosed technology.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

As mentioned above in the Background section, the flexibility, scalability, and affordability offered by cloud computing are fundamental to the massively connected compute paradigm of the future. However, virtualization of resources, complex communication, and fluctuations in computational demands can make running complex applications challenging.

Therefore, applications are migrating to the cloud in search of scalability, resilience, and cost-efficiency. At the same time, silicon scaling has stalled, precipitating a wave of new specialized hardware accelerators such as tensor processing units (TPUs), intelligence processing units (IPUs), on-demand graphics processing units (GPU), and field programmable gate arrays (FPGA) support from cloud providers.

However, cloud solutions with reconfigurable processors such as the above-mentioned CGRAs have emerged as a contender for cloud accelerators, combining significant computational capabilities with an architecture more amenable to virtualization, and a lower power footprint. Reconfigurable processors provide low-latency and energy-efficient solutions for deep neural network inference applications. However, as deep learning accelerators, reconfigurable processors are optimized to provide high performance for single-task and static-workload scenarios, which conflict with the multi-tenancy and dynamic resource allocation requirements of cloud computing.

Recently, systems have emerged that provide virtualized reconfigurable processors that support multi-client and dynamic-workload scenarios in the cloud. Such systems typically include multiple interconnected reconfigurable processors, whereby the reconfigurable processors include arrays of configurable units and memory that are allocated to the virtualized reconfigurable processors and execute user applications.

In some scenarios, such systems include different types of reconfigurable processors, and the different types of reconfigurable processors are made available in a pool of reconfigurable processors for allocation to the virtualized reconfigurable processors on which the user application can be executed. Typically, the different types of reconfigurable processors differ in architecture, layout, technology, or any other property such as the processor generation. In these scenarios, it would be desirable to provide support for executing an application using more than one of the different types of reconfigurable processors.

FIG. 1 shows a system 100 for a data-parallel execution of at least two implementations of an application or applications 108 on reconfigurable processors 142*a*, 142*n* with different layouts using first and second processing nodes 111*a*, 111*n*. The first processing node 111*a* is identified as "processing node 1," and the second processing node 111*n* is identified as "processing node n." The first and second processing nodes 111*a*, 111*n* are configured to collaboratively execute configuration files for applications 108 in a distributed fashion.

One skilled in the art will appreciate that the system 100 can have any number of processing nodes operatively coupled for data communications through a network 136 (also called herein "network fabric 136"). Examples of the network 136 include a Storage Area Network (SAN) and a Local Area Network (LAN). The SAN can be implemented with a variety of data communications fabrics, devices, and protocols. For example, the fabrics for the SAN can include Fibre Channel, Ethernet, InfiniBand, Serial Attached Small Computer System Interface ('SAS'), or the like. Data communication protocols for use with the SAN can include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like.

The LAN can also be implemented with a variety of fabrics, devices, and protocols. For example, the fabrics for the LAN can include Ethernet (802.3), wireless (802.11), or the like. Data communication protocols for use in the LAN can include Transmission Control Protocol ('TCP'), User Datagram Protocol ('UDP'), Internet Protocol (IP), Hypertext Transfer Protocol ('HTTP'), Wireless Access Protocol ('WAP'), Handheld Device Transport Protocol ('HDTP'), Session Initiation Protocol ('SIP'), Real-time Transport Protocol ('RTP'), or the like.

The network 136 also connects other network components in the system 100. Examples of other network components include buses, switches, routers, load balancers, hypervisors, and Application Programming Interfaces (APIs). Along the network 136, the switches, for example, can receive packets via a plurality of input ports and can transmit packets via a plurality of output ports. The processing nodes 111*a*, 111*n* in the system 100 can communicate with each other through the network 136 using a variety of networking paths established by the switches. Another example of the network 136 is a Wide Area Network (WAN).

A processing node (or node) is an addressable application running on a hardware device or virtual device that attaches to a network, and is capable of sending, receiving, or forwarding information over a communication channel to or from other processing nodes. Examples of electronic devices which can be deployed as hardware processing nodes include all varieties of computers, workstations, laptop computers, handheld computers, and smartphones. Processing nodes can be implemented in a cloud-based server system. More than one virtual device configured as a processing node can be implemented using a single physical device.

The system 100 may include a host system. The host system may be implemented as a single host. Alternatively, the host system may include more than one host. If desired, the hosts of the host system may be distributed and located with the respective processing nodes.

The illustrative processing nodes 111a, 111n of FIG. 1 respectively include a host 102a, 102n with attached host memory 134a, 134n, reconfigurable processors 142a, 142n with attached reconfigurable processor memory 162a, 162n, a network interface controller 132a, 132n, and interconnection resources between these components.

The system 100 comprises a pool of reconfigurable dataflow resources. The pool of reconfigurable dataflow resources can have a variety of compute scales and hierarchies. Illustratively, the pool of reconfigurable dataflow resources may include a plurality of reconfigurable processors, which is supported by different bus and memory resources. For example, a host processor in the host may exchange data with the reconfigurable processors over a local bus like Peripheral Component Interconnect Express (PCIe) interface or another interconnect fabric.

The host processor can have a runtime processor (or a runtime logic) that manages resource allocation, memory mapping, and execution of configuration files for applications requesting execution from the host processor. PCIe is described in formal PCI Express specifications available from PCI-SIG Administration, Beaverton, OR, all of which are incorporated herein by reference. As used herein, the terms "PCIe bus" and "PCIe fabric" refer to a bus or fabric that satisfies the requirements of Revision 1.0 of the PCI Express specification or any subsequent revision thereof. PCIe is described also for example in Jackson and Budruk, PCI Express Technology 3.0, available from MindShare, Inc., Cedar Park, TX, also incorporated by reference herein. The terms "PCIe bus" and "PCIe fabric" are used interchangeably herein.

The pool of reconfigurable dataflow resources can be a rack (or cluster) of processing nodes. Each processing node in the rack can run a respective plurality of reconfigurable processors. If desired, processing node 111a may include a first reconfigurable processor (e.g., RP1) of reconfigurable processors 142a having a first layout that imposes first constraints for the data-parallel execution of the applications 108, and processing node 111n may include a second reconfigurable processor (e.g., RP1) of reconfigurable processors 142n having a second layout that imposes second constraints for the data-parallel execution of the applications 108, wherein the first and second layouts are different, and wherein at least a subset of the first and second constraints is different.

If desired, the network interface controllers, 132a, 132n, the network 136, the local buses 126a, 127a, 127n, 126n may form data transfer resources that interconnect the first and second reconfigurable processors in the pool of reconfigurable data flow resources and enables the first and second reconfigurable processors to receive and send data between each other as part of the pool of reconfigurable data flow resources. The data transfer resources may include at least one of a peripheral component interface express (PCIe) channel, a direct memory access (DMA) channel, a double data rate (DDR) channel, an InfiniBand channel, or an Ethernet channel.

The pool of reconfigurable dataflow resources can be a pod that comprises a plurality of racks connected through the network 136. The pool of reconfigurable dataflow resources can be a superpod that comprises a plurality of pods connected through the network 136. The pool of reconfigurable dataflow resources can be a zone that comprises a plurality of superpods connected through the network 136. The pool of reconfigurable dataflow resources can be the system 100 that comprises a plurality of zones connected through the network 136.

The pool of reconfigurable dataflow resources can include bus (or transfer) resources. Examples of the bus resources include PCIe channels, Direct Memory Access (DMA) channels, and Double Data Rate (DDR) channels. The pool of reconfigurable dataflow resources can include memory (or storage) resources. Examples of the memory resources include main memory (e.g., off-chip/external Dynamic Random-Access Memory (DRAM), NAND flash), local secondary storage (e.g., local disks (e.g., HDD, SSD)), and remote secondary storage (e.g., distributed file systems, web servers). Other examples of the memory resources include latches, registers, flops, bypass networks, and caches (e.g., ones explicitly addressed by RAMs/DRAMs/SRAMs). The pool of reconfigurable dataflow resources is dynamically scalable to meet the performance requirements of applications requesting execution. The applications access the pool of reconfigurable dataflow resources over one or more networks (e.g., the Internet).

Each processing node 111a, 111n may include a respective host 102a, 102n, which is sometimes also referred to as a host processor. The first processing node 111a may comprise a first host processor 102a. Examples of the first host processor 102a include x86 and x64 processors. The first host processor 102a interfaces with a host memory 134a (e.g., RAM). The first host processor 102a has a first compiler 112a to receive the applications 108, generate for the applications 108 based on the first constraints a first configuration file, and store the first configuration file in an archive of configuration files 170, wherein the first configuration file is adapted to be executed on the first reconfigurable processors 142a and data-parallel compatible with executing the applications 108 on the second reconfigurable processors 142n.

Illustratively, the first host processor 102a may include a runtime logic 122a to execute the compiled applications on a plurality of reconfigurable processors 142a. The runtime logic 122a is configured to provide on-demand access to the pool of reconfigurable dataflow resources, which can be rapidly provisioned and released with minimal management effort or service provider interaction.

By way of example, the reconfigurable processors 142a are Coarse-Grained Reconfigurable Architectures (CGRAs). The reconfigurable processors 142a interface with a reconfigurable processor memory 162a (e.g., DRAM). Each reconfigurable processor RP1, . . . , RP N of the reconfigurable processors 142a includes an array of configurable units (e.g., compute units and memory units) in a programmable interconnect fabric. The array of configurable units in a reconfigurable processor is partitionable into a plurality of subarrays (or tiles) of configurable units.

A Network Interface Controller 132a (e.g., NIC, SmartNIC) connects the first host processor 102a and the reconfigurable processors 142a to the network 136. A bus switch 124a uses local buses 125a, 126a, and 127a to operatively couple the first host processor 102a, the reconfigurable processors 142a, and the Network Interface Controller 132a. Examples of the local buses 125a, 126a, and 127a include Peripheral Component Interconnect Express (PCIe), Cache Coherent Interconnect for Accelerators (CCIX), Compute Express Link (CXL), and Open Coherent Accelerator Processor Interface (OpenCAPI).

In the present context, a SmartNIC may implement the network interface controller 132a. The SmartNIC may be equipped with a fully programmable hardware implementation, supporting an operating system configured for network processing tasks. The hardware implementation may comprise System-on-Chip (SoC), FPGAs, ASICs, CGRAs, or other programmable processor circuits such as the ARM family. The SmartNIC may support sets of specialized hardware functionalities accelerates a specific class of functions (e.g., Open vSwitch data-plane) or to perform generic packet and flow-filtering, packet inspection, flow table processing, encryption, RDMA, VXLAN overlays and NVMe-oF functionality.

The SmartNIC may include a host kernel-bypass logic for sending and receiving packets to/from nodes and additional hosts. The SmartNIC may accomplish this by providing a set of physical addresses comprising a shared memory for inputs and outputs. In one aspect, the reprogrammable processor may directly access sets of SmartNIC FIFO buffers using a combination of head and tail pointers to push and pull data, thus bypassing the host kernel and reducing at least one hop. A host may also interface directly to the SmartNIC by writing to a physical address without requiring drivers to control the network flow, further increasing theoretical throughput.

In one aspect, the SmartNIC may provide a configuration interface to specify the physical addresses of a plurality of I/O shared memory buffers comprising FIFO queues and mapping tables for memory regions containing packet buffers. In an additional aspect, the SmartNIC may couple nodes, reprogrammable processors (RPs) and hosts to retrieve packet buffers from shared memory buffers and to transmit packet buffers from host, node, or RP DRAM to the SmartNIC shared memory buffers over a network.

The second processing node 111n comprises a second host processor 102n. Examples of the second host processor 102n include x86 and x64 processors. The second host processor 102n interfaces with a host memory 134n (e.g., RAM). The second host processor 102n has a compiler 112n to receive the applications 108, generate for the applications 108 based on the second constraints a second configuration file, and store the second configuration file in the archive of configuration files 170, wherein the second configuration file is adapted to be executed on reconfigurable processors RP 1, ... RP N of the second reconfigurable processors 142n and data-parallel compatible with executing the applications 108 on the first reconfigurable processors 142a.

Illustratively, the second reconfigurable processors 142n include Coarse-Grained Reconfigurable Architectures (CGRAs). The reconfigurable processors 142n interface with a reconfigurable processor memory 162n (e.g., DRAM). Each of the reconfigurable processors 142n includes an array of configurable units (e.g., compute units and memory units) in a programmable interconnect fabric. The array of configurable units in a reconfigurable processor is partitionable into a plurality of subarrays (or tiles) of configurable units.

A Network Interface Controller 132n (e.g., NIC, SmartNIC) connects the second host processor 102n and the reconfigurable processors 142n to the network 136. A bus switch 124n uses local buses 125n, 126n, and 127n to operatively couple the second host processor 102n, the reconfigurable processors 142n, and the Network Interface Controller 132n. Examples of the local buses 125n, 126n, and 127n include Peripheral Component Interconnect Express (PCIe), Cache Coherent Interconnect for Accelerators (CCIX), Compute Express Link (CXL), and Open Coherent Accelerator Processor Interface (OpenCAPI).

In the present context, a SmartNIC may implement the network interface controller 132n. The SmartNIC may be equipped with a fully programmable hardware implementation, supporting an operating system configured for network processing tasks. The hardware implementation may comprise System-on-Chip (SoC), FPGAs, ASICs, CGRAs, or other programmable processor circuits such as the ARM family. The SmartNIC may support sets of specialized hardware functionalities accelerates a specific class of functions (e.g., Open vSwitch data-plane) or to perform generic packet and flow-filtering, packet inspection, flow table processing, encryption, RDMA, VXLAN overlays and NVMe-oF functionality.

The SmartNIC may include a host kernel-bypass logic for sending and receiving packets to/from nodes and additional hosts. The SmartNIC may accomplish this by providing a set of physical addresses comprising a shared memory for inputs and outputs. In one aspect, the reprogrammable processor may directly access sets of SmartNIC FIFO buffers using a combination of head and tail pointers to push and pull data, thus bypassing the host kernel and reducing at least one hop. A host may also interface directly to the SmartNIC by writing to a physical address without requiring drivers to control the network flow, further increasing theoretical throughput.

In one aspect, the SmartNIC may provide a configuration interface to specify the physical addresses of a plurality of I/O shared memory buffers comprising FIFO queues and mapping tables for memory regions containing packet buffers. In an additional aspect, the SmartNIC may couple nodes, reprogrammable processors (RPs) and hosts to retrieve packet buffers from shared memory buffers and to transmit packet buffers from host, node, or RP DRAM to the SmartNIC shared memory buffers over a network.

The applications 108 are executed on the reconfigurable processors 142a, 142n in a distributed fashion by programming the individual compute and memory components to asynchronously receive, process, and send data and control information. In the reconfigurable processors 142a, 142n, computation can be executed as deep, nested dataflow pipelines that exploit nested parallelism and data locality very efficiently. These dataflow pipelines contain several stages of computation, where each stage reads data from one or more input buffers with an irregular memory access pattern, performs computations on the data while using one or more internal buffers to store and retrieve intermediate results, and produce outputs that are written to one or more output buffers. The structure of these pipelines depends on the control and dataflow graph representing the application. Pipelines can be arbitrarily nested and looped within each other.

The applications 108 comprise high-level programs. A high-level program may include source code written in programming languages like C, C++, Java, JavaScript, Python, and/or Spatial, for example, using deep learning frameworks 114 such as PyTorch, TensorFlow, ONNX, Caffe, and/or Keras. The high-level program can implement computing structures and algorithms of machine learning models like AlexNet, VGG Net, GoogleNet, ResNet, Res- NeXt, RCNN, YOLO, SqueezeNet, SegNet, GAN, BERT, ELMo, USE, Transformer, and/or Transformer-XL.

In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

Regarding loops in the high-level programs of the applications 108, loops directly nested in a loop body are termed the child loops of the outer parent loop. A loop is called an innermost loop if it does not have any children, i.e., there are no nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

Software development kit (SDK) 115 generates computation graphs (e.g., data flow graphs, control graphs) of the high-level programs of the applications 108. The SDK 115 transforms the input behavioral description of the high-level programs into an intermediate representation such as the computation graphs. This may include code optimization steps like false data dependency elimination, dead-code elimination, and constant folding. The computation graphs encode the data and control dependencies of the high-level programs.

The computation graphs may comprise nodes and edges. The nodes can represent compute operations and memory allocations. The edges can represent data flow and flow control. In some implementations, each loop in the high-level programs can be represented as a "controller" in the computation graphs. The computation graphs support branches, loops, function calls, and other variations of control dependencies. In some implementations, after the computation graphs are generated, additional analyses or optimizations focused on loop transformations can be performed, such as loop unrolling, loop pipelining, loop fission/fusion, and loop tiling.

Illustratively, the SDK 115 provides libraries that contain predefined functions like linear algebra operations, element-wise tensor operations, non-linearities, and reductions required for creating, executing, and profiling the computation graphs on the reconfigurable processors. The SDK 115 communicates with the deep learning frameworks 114 via Application Programming Interfaces (APIs) 124.

Each compiler 112a, 112n may transform the computation graphs into a hardware-specific configuration, which is specified in an execution file generated by the respective compiler 112a, 112n. Thus, the first compiler 112a receives the application 108, generates for the application 108 based on the first constraints that are imposed by the layout of reconfigurable processors 142a a first configuration file, and stores the first configuration file in the archive of configuration files 170, whereby the first configuration file is adapted to be executed on the first reconfigurable processors 142a and data-parallel compatible with executing the application 108 on the second reconfigurable processors 142n. The second compiler 112n receives the application 108, generates for the application 108 based on the second constraints that are imposed by the layout of reconfigurable processors 142n a second configuration file, and stores the second configuration file in the archive of configuration files 170, whereby the second configuration file is adapted to be executed on the second reconfigurable processors 142n and data-parallel compatible with executing the application 108 on the first reconfigurable processors 142a.

If desired, the system 100 may include a third compiler. The third compiler may receive the application, generate for the application a third configuration file, and store the third configuration file in the archive 170 of configuration files. As an example, the third configuration file may include common code that is adapted to be executed on both, the first and second reconfigurable processors 142a, 142n.

Illustratively, the respective compiler 112a, 112n partitions the computation graphs into memory allocations and execution fragments, and these partitions are specified in the respective execution file. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Different ones of the execution fragments can contain different amounts of computation. Execution fragments can represent parallel patterns or portions of parallel patterns and are executable asynchronously.

In some implementations, the partitioning of the computation graphs into the execution fragments includes treating calculations within at least one innermost loop of a nested loop of the computation graphs as a separate execution fragment. In other implementations, the partitioning of the computation graphs into the execution fragments includes treating calculations of an outer loop around the innermost loop of the computation graphs as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data required to implement the computation graphs, and these memory allocations are specified in the respective execution file. Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The respective compiler 112a, 112n binds memory allocations to virtual memory units and binds execution fragments to virtual compute units, and these bindings are specified in the respective execution file. In some implementations, the respective compiler partitions execution fragments into memory fragments and compute fragments, and these partitions are specified in the respective execution file.

A memory fragment comprises address calculations leading up to a memory access. A compute fragment comprises all other operations in the parent execution fragment. In one implementation, each execution fragment is broken up into a plurality of memory fragments and exactly one compute fragment. In one implementation, the respective compiler 112a, 112n performs the partitioning using reverse dataflow analysis such that inputs to an address used in a memory access are recursively flagged until the compiler reaches either constant values or (bound) loop/pattern iterators. A single execution fragment can produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments of the execution fragments are configured to index into data structures. At least one of the memory fragments indexes into a data structure in the logical memory spaces of one of the memory allocations. Each compute and memory fragment preserves information about all loops whose loop bodies directly contain the operations in the corresponding execution fragment. In one implementation, this corresponds to replicating the calculation of the loop iterators of each loop into each compute and memory fragment. This replication allows each fragment to preserve the same iterative behavior as the original program while also allowing distributed calculation of loop iterators.

The respective compiler 112a, 112n assigns the memory fragments to the virtual memory units and assigns the compute fragments to the virtual compute units, and these assignments are specified in the respective execution file. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The respective compiler 112a, 112n allocates the virtual memory units to physical memory units of a reconfigurable processor (e.g., pattern memory units (PMUs) of the reconfigurable processor) of reconfigurable processors 142a, 142n, respectively and allocates the virtual compute units to physical compute units of the reconfigurable processor (e.g., pattern compute units (PCUs) of the reconfigurable processor), and these allocations are specified in the respective execution file. The respective compiler 112a, 112n places the physical memory units and the physical compute units onto positions in an array of physical configurable units of the respective reconfigurable processors 142a, 142n and routes data and control networks between the placed positions, and these placements and routes are specified in the respective execution file. In one implementation, this includes allocating physical resources such as counters and registers within each physical memory and compute unit, and these allocations are specified in the respective execution file.

The respective compiler 112a, 112n may translate the applications 108 developed with commonly used open-source packages such as Keras and/or PyTorch into reconfigurable processor specifications. The respective compiler 112a, 112n generates the configuration files with configuration data for the placed positions and the routed data and control networks. In one implementation, this includes assigning coordinates and communication resources of the physical memory and compute units by placing and routing units onto the array of the processor while maximizing bandwidth and minimizing latency.

The respective runtime logic 122a, 122n may retrieve the respective execution file from the archive of configuration files 170 and use the execution file for resource allocation, memory mapping, and execution of the configuration files for the applications 108 on the respective reconfigurable processors 142a, 142n. The respective runtime logic 122a, 122n may communicate with the SDK 115 over APIs 154 (e.g., Python APIs). If desired, the respective runtime logic 122a, 122n can directly communicate with the deep learning frameworks 114 over APIs 152 (e.g., C/C++ APIs).

Furthermore, the respective runtime logic 122a, 122n is operatively coupled to the reconfigurable processors 142a, 142n (e.g., via a PCIe interface or any other interface that enables the respective runtime logic 122a, 122n to exchange data with the reconfigurable processors 142a, 142n).

The respective runtime logic 122a, 122n parses the execution file, which includes a plurality of configuration files. Configuration files in the plurality of configurations files include configurations of the virtual data flow resources that are required to execute the user applications 108. The respective runtime logic 122a, 122n allocates resources (e.g., a subset of the arrays of physical configurable units) in the reconfigurable processors 142a, 142n to the virtual data flow resources.

The respective runtime logic 122a, 122n then loads the configuration files for the applications 108 to the allocated resources (e.g., to the subset of the arrays of physical configurable units). The respective runtime logic 122a, 122n then starts execution of the user applications 108 on the allocated resources (e.g., on the subset of the arrays of physical configurable units). For example, the respective runtime logic 122a, 122n executes a mission function procedure or set of procedures using the reconfigurable processors 142a, 142n, such as inferencing or learning in an artificial intelligence or machine learning system.

Illustratively, the application 108 includes a neural network stochastic gradient descent training application, and the first and second compilers 112a, 112n generate identical first and second groupings of gradients and store the identical first and second groupings of the gradients in respective first and second contiguous address blocks in the first and second configuration files.

By way of example, the first and second compilers 112a, 112n may generate first and second addresses for storing gradients in memory. If desired, a relative address alignment of the first and second addresses is identical. Illustratively, two neighboring addresses for storing a first and a second of the gradients have a same distance between the neighboring addresses. If desired, the first and second reconfigurable processors 142a, 142n compute gradients in the same order.

A virtual machine for the purposes of this description comprises a set of reconfigurable data flow resources (including arrays of physical configurable units in one or more reconfigurable processor and bus and memory channels) configured to support execution of an application in arrays of physical configurable units and associated bus and memory channels in a manner that appears to the application as if there were a physical constraint on the resources available, such as would be experienced in a physical machine. The virtual machine can be established as a part of the application of the mission function that uses the virtual machine, or it can be established using a separate configuration mechanism. In implementations described herein, virtual machines are implemented using resources of the reconfigurable processors 142*a*, 142*n* that are also used in the application, and so the configuration files for the application 108 include the configuration data for its corresponding virtual machine, and links the application 108 to a particular set of physical configurable units in the arrays of physical configurable units and associated bus and memory channels.

One skilled in the art would appreciate that the execution file can similarly specify reconfigurable processors or portions thereof spanning across racks, pods, superpods, and zones in a data center, and as a result the metadata identifies virtual data flow resources spanning across the racks, pods, superpods, and zones in the data center for loading and executing the configuration files for the particular application.

Figure 2:
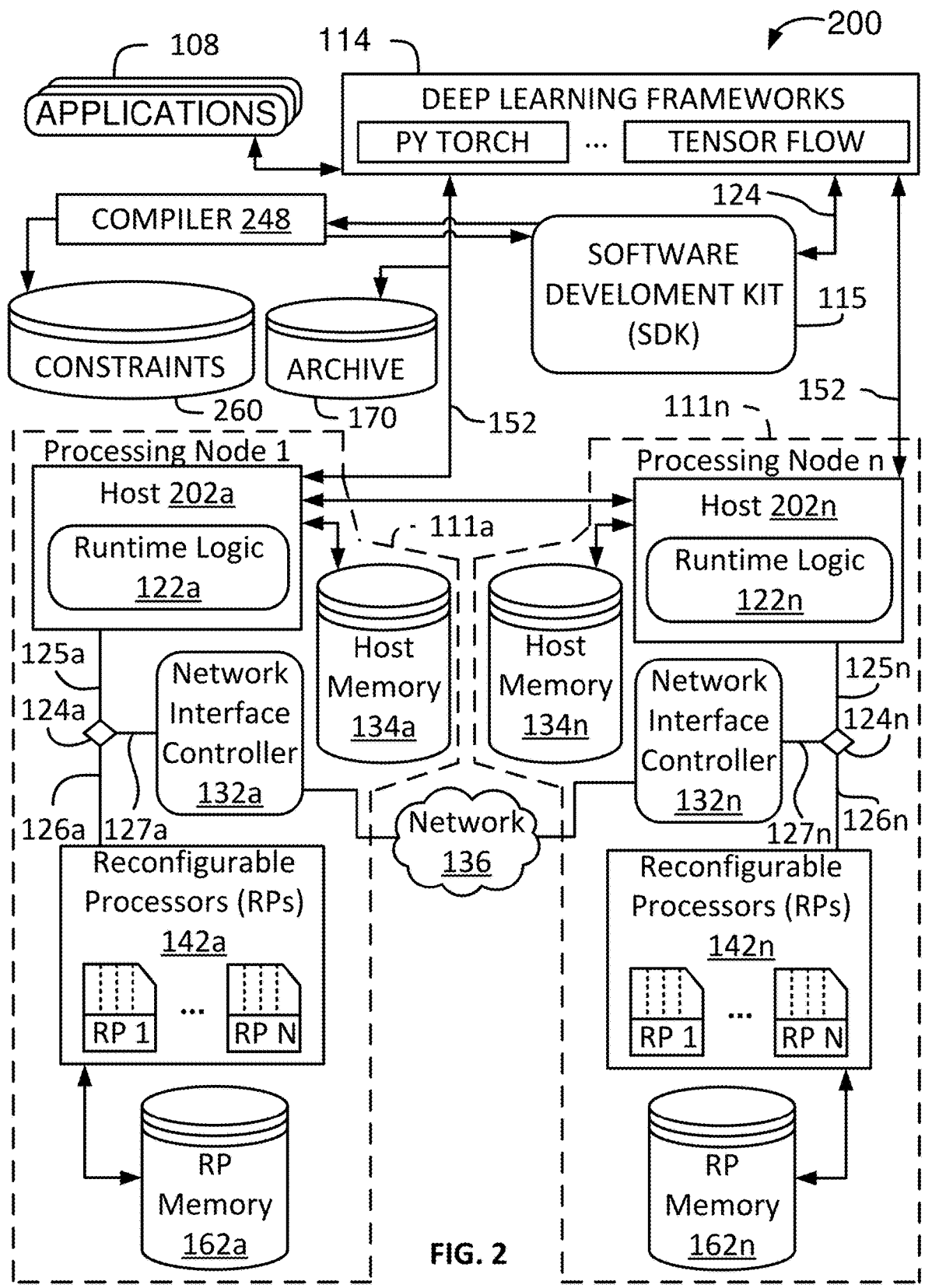
FIG. 2 is a diagram of an illustrative system for a data-parallel execution of at least two implementations of an application on reconfigurable processors with different layouts using first and second processing nodes and a single compiler that is associated with a Software Development Kit (SDK) in accordance with the disclosed technology.

FIG. 2 shows a system 200 for a data-parallel execution of at least two implementations of applications 108 on reconfigurable processors with different layouts using first and second processing nodes similar. Contrary to the system 100 of FIG. 1, the system 200 of FIG. 2 has a single compiler 248 that is associated with and operatively coupled to the SDK 115. Therefore, the hosts 202*a*, 202*n* may include runtime logic 122*a*, 122*n*. However, contrary to the hosts 102*a*, 102*n*, compilers may be absent from hosts 202*a* and 202*n*.

The compiler 248 has access to constraints 260 (e.g., in the form of constraint files) that are associated with the different reconfigurable processors 142*a*, 142*n* in the system 200. For example, different reconfigurable processors may have different layouts that impose different constraints for the data-parallel execution of the applications 108. The compiler 248 may access the constraints 260 and generates for the applications 108 based on the different constraints 260 different configuration files that are stored in an archive of configuration files 170.

For example, consider the scenario in which the system 200 includes first reconfigurable processors 142*a* having a first layout that imposes first constraints for the data-parallel execution of the applications 108 and second reconfigurable processors 142*n* having a second layout that imposes second constraints for the data-parallel execution of the applications 108, whereby the first and second layouts are different and at least a subset of the first and second constraints is different. Consider further that the compiler 248 accesses first and second constraints as constraints 260. In this scenario, the compiler 248 may generate for the applications 108 based on the first constraints a first configuration file and based on the second constraints a second configuration file and store the first and second configuration files in the archive of configuration files 170. If desired, the compiler 248 may generate for the applications 108 a third configuration file that includes common code that is adapted to be executed on the first and second reconfigurable processors 142*a*, 142*n* and store the third configuration file in the archive of configuration files 170.

Figure 3:
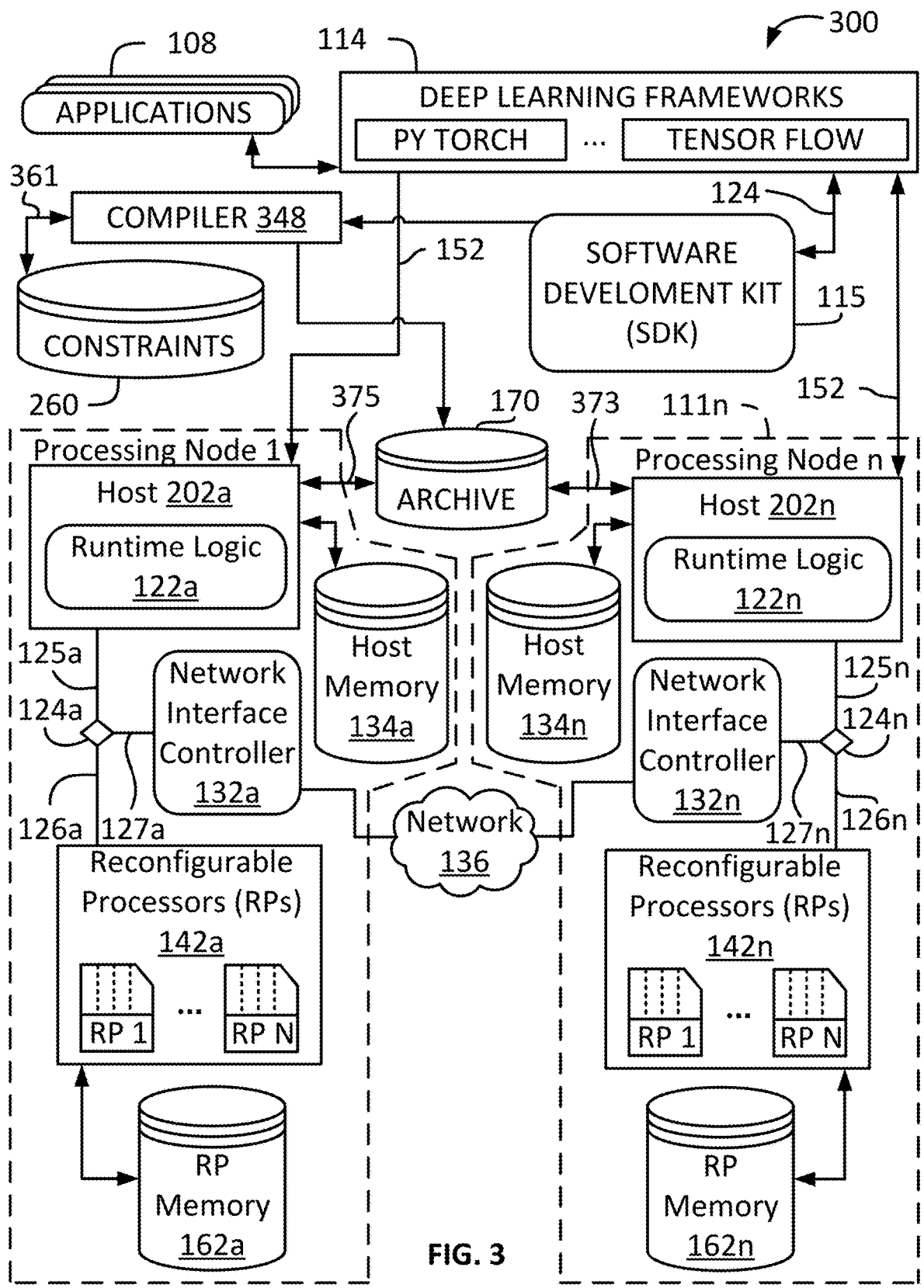
FIG. 3 is a diagram of an illustrative system for a data-parallel execution of at least two implementations of an application on reconfigurable processors with different layouts using first and second processing nodes and a single compiler that is associated with the hosts in the processing nodes in accordance with the disclosed technology.

FIG. 3 shows a system 300 for a data-parallel execution of at least two implementations of applications 108 on reconfigurable processors 142*a*, 142*n* with different layouts using first and second processing nodes 111*a*, 111*n*. Contrary to the system 200 of FIG. 2, the single compiler 348 of FIG. 3 is associated with and operatively coupled to the SDK 115 and the hosts 202*a*, 202*n* in the processing nodes 111*a*, 111*n*.

The compiler 348 may retrieve the constraints 260 based on the reconfigurable processors 142*a*, 142*n* in the processing nodes 111*a*, 111*n* on which the applications 108 are executed and generate the configuration file based on the reconfigurable processors 142*a*, 142*n* in the targeted processing node 111*a*, 111*n*. The compiler stores the generated configuration files in the archive of configuration files 170.

The respective runtime processor that includes the runtime logic 122*a*, 122*n* may retrieve the respective configuration file from the archive of configuration files 170, load the respective configuration file to the respective reconfigurable processors 142*a*, 142*n*, and start execution of the applications 108 on the respective reconfigurable processors 142*a*, 142*n*.

For example, consider the scenario in which the system 300 includes first reconfigurable processors 142*a* having a first layout that imposes first constraints for the data-parallel execution of the applications 108 and second reconfigurable processors 142*n* having a second layout that imposes second constraints for the data-parallel execution of the applications 108, whereby the first and second layouts are different and at least a subset of the first and second constraints is different. Consider further that the compiler 348 accesses first and second constraints as constraints 260. In this scenario, the compiler 348 may generate for the applications 108 based on the first constraints a first configuration file and based on the second constraints a second configuration file and store the first and second configuration files in the archive of configuration files 170. The first runtime processor 122*a* is operatively coupled to the first reconfigurable processors 142*a* and configured to retrieve the first configuration file from the archive of configuration files 170, load the first configuration file to the first reconfigurable processors 142*a*, and start a first execution of the applications 108 on the first reconfigurable processors 142*a* in a first implementation of the application. The second runtime processor 122*n* is operatively coupled to the second reconfigurable processors 142*n* and configured to retrieve the second configuration file from the archive of configuration files 170, load the second configuration file to the second reconfigurable processors 142*n*, and start a second execution of the applications 108 on the second reconfigurable processors 142*n* in a second implementation of the applications 108.

Figure 4:
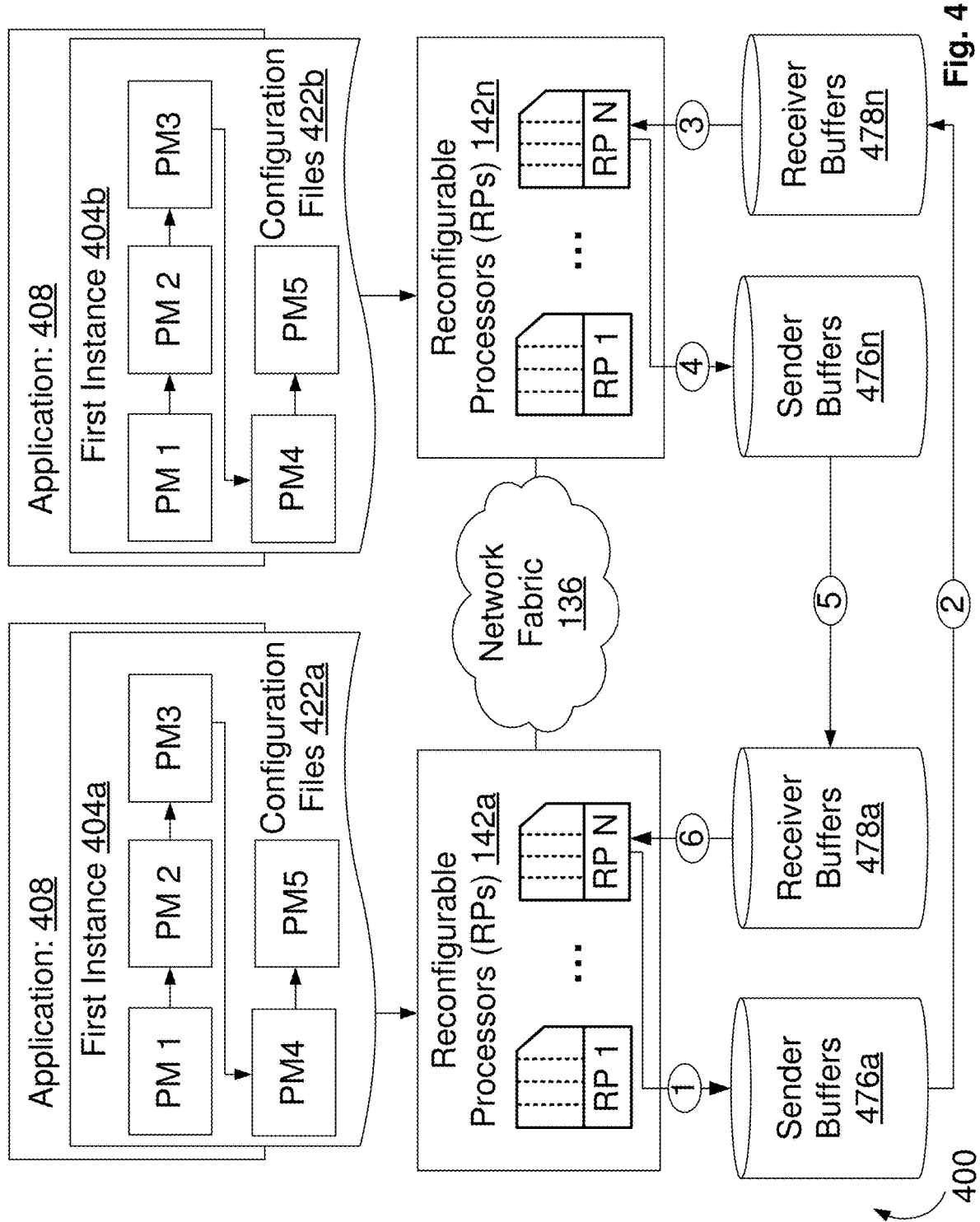
FIG. 4 is a diagram of an illustrative execution of two implementations of an application in parallel using illustrative buffer-based inter-node streaming of configuration data over a network fabric (data parallelism).

FIG. 4 illustrates an execution 400 of two implementations of an application 408 in parallel using illustrative buffer-based inter-node streaming of configuration data over the network fabric 136. This is referred to herein as "data parallelism."

In the example shown in FIG. 4, the application 408 includes processing module 1 (PM1) which provides data to processing module 2 (PM2) which provides data to processing module 3 (PM3) which provides data to processing module 4 (PM4) which provides data to processing module 5 (PM5). Thus, running the application 408 in its entirety means that all 5 processing modules are executed.

As shown in FIG. 4, a pool of reconfigurable data flow resources comprises first reconfigurable processors 142*a* having a first layout that imposes first constraints for the data-parallel execution of the application 408, second reconfigurable processors 142*n* having a second layout that imposes second constraints for the data-parallel execution of the application 408, wherein the first and second layouts are different, and wherein at least a subset of the first and second constraints is different. The pool of reconfigurable data flow resources further includes data transfer resources (e.g., network fabric 136 and/or buffers 476*a*, 478*a*, 476*n*, 478*n*) that interconnect the first and second reconfigurable processors in the pool of reconfigurable data flow resources and enables the first and second reconfigurable processors to receive and send data between each other.

A host system may be operatively coupled to the first and second reconfigurable processors 142a, 142n. The host system may include a first compiler that receives the application 408, generates for the application 408 based on the first constraints a first configuration file 422a, and stores the first configuration file 422a in an archive of configuration files. The first configuration file 422a is adapted to be executed on the first reconfigurable processors 142a and data-parallel compatible with executing the application on the second reconfigurable processor 142n. The host system may include a second compiler that receives the application 408, generates for the application 408 based on the second constraints a second configuration file 422b, and stores the second configuration file in the archive of configuration file. The second configuration file 422b is adapted to be executed on the second reconfigurable processors 142n and data-parallel compatible with executing the application 408 on the first reconfigurable processors 142a.

A runtime processor may include runtime logic (e.g., runtime logic 122a of FIG. 1) that is configured to initialize a first instance of the dataflow graph 404a and a second instance of the dataflow graph 404b. The runtime processor may be configured to execute first configuration files 422a for the first instance 404a of the dataflow graph on the first reconfigurable processor (e.g., RP N) of the first reconfigurable processors 142a. The same or another runtime processor (e.g., including runtime logic 122a of FIG. 1 or runtime logic 122n of FIG. 1) may be configured to second execute configuration files 422b for the second instance 404b of the dataflow graph on the second reconfigurable processor (e.g., RP N) of the second reconfigurable processors 142n.

The application 408 may include a neural network training application, implemented, for example, by Stochastic Gradient Descent (SGD) that comprises a forward pass and a backward pass. The backward pass comprises a delta pass and a chain pass. The forward pass propagates activations in a forward direction. The delta pass propagates deltas in a backward direction. The chain pass calculates gradients based on the deltas as the deltas are generated in the delta pass.

The runtime processor may be configured to use the first plurality of buffers 476a, 478a and the second plurality of buffers 476n, 478n to stream data between the first instance of the dataflow graph and the second instance of the dataflow graph. The data may include gradients generated during the backward pass of a stochastic gradient descend application executing on the first and second instances of the dataflow graph.

Illustratively, the first plurality of buffers includes a first set of sender buffers 476a configured to receive data from the first reconfigurable processor and provide the data to a second set of receiver buffers 478n in the second plurality of buffers. The second set of receiver buffers 478n are configured to provide the data to the second reconfigurable processor. The second plurality of buffers includes a second set of sender buffers 476n configured to receive data from the second reconfigurable processor and provide the data to a first set of receiver buffers 478a in the first plurality of buffers. The first set of receiver buffers 478a are configured to provide the data to the first reconfigurable processor.

By way of example, the execution includes streaming input data for the application 408 from the first reconfigurable processor to the second reconfigurable processor. In some implementations, one or more of the sender buffers in the first set of sender buffers 476a are configured to receive the input data from the first reconfigurable processor (operation one) and provide the input data to one or more receiver buffers in the second set of receiver buffers 478n (operation two).

For example, the first reconfigurable processor is configured to push the input data to a first SmartNIC (e.g., via a PCIe Endpoint Port (EP)) (operation one). In some implementations, operation one is accomplished by an address generator of the first reconfigurable processor (e.g., Address Generation and Coalescing Units (AGCU)) writing the input data to physical memory addresses mapped to the sender buffers in the first set of sender buffers 476a (e.g., via a hardware write (HWRITE) command). In one implementation, the first SmartNIC is configured to write the input data, after encapsulation, into the sender buffers in the first set of sender buffers 476a. In one implementation, the first SmartNIC is configured to update tail pointers of the sender buffers in the first set of sender buffers 476a in response to the writing of the input data. In one implementation, the first SmartNIC is configured to process the input data as a payload, apply encapsulation, store it in caches, and stream it to a second SmartNIC over the network fabric 136 (e.g., via a MAC port).

One skilled in the art will appreciate that operations one and six may comprise streaming network packets between the first reconfigurable processor and the first SmartNIC over local PCIe buses using a protocol like Transaction Layer Packet (TLP). One skilled in the art will also appreciate that operation two may comprise streaming network packets from the first SmartNIC to the second SmartNIC over the network fabric 136 (e.g., Ethernet, InfiniBand (IB)) using protocols like RDMA over Converged Ethernet (RoCE), TCP, User Datagram Protocol (UDP), and/or Quick UDP Internet Connections (QUIC).

The receiver buffers in the second set of receiver buffers 478n are configured to provide the input data to the second reconfigurable processor (operation three). In some implementations, operation three is accomplished by an address generator of the second reconfigurable processor (e.g., Address Generation and Coalescing Units (AGCU)) reading the input data from physical memory addresses mapped to the receiver buffers in the second set of receiver buffers 478n (e.g., via a hardware read (HWREAD) command). In one implementation, the first SmartNIC is configured to send the input data to the second SmartNIC in response to the updated tail pointers. In one implementation, the second SmartNIC is configured to write the input data, after decapsulation, into the receiver buffers in the second set of receiver buffers 478n. In one implementation, the second SmartNIC is configured to update tail pointers of the receiver buffers in the second set of receiver buffers 478n in response to the writing of the input data. The second reconfigurable processor is configured to pull the input data from the second SmartNIC (e.g., via a PCIe Endpoint Port (EP)) by reading the input data from the receiver buffers in the second set of receiver buffers 478n in response to the updated tail pointers.

In some implementations, the execution includes streaming output data for the applications 408 from the second reconfigurable processor to the first reconfigurable processor. The output data is generated as a result of processing the input data (e.g., processing of the input data by the second reconfigurable processor). In some implementations, one or more of the sender buffers in the second set of sender buffers 476n are configured to receive the output data from the second reconfigurable processor (operation four) and provide the output data to one or more receiver buffers in the first set of receiver buffers 478a (operation five).

The second reconfigurable processor is configured to push the output data to the second SmartNIC (e.g., via the PCIe Endpoint Port (EP)) (operation four). In some implementations, operation four is accomplished by an address generator of the second reconfigurable processor (e.g., Address Generation and Coalescing Units (AGCU)) writing the output data to physical memory addresses mapped to the sender buffers in the second set of sender buffers 476n (e.g., via a hardware write (HWRITE) command). In one implementation, the second SmartNIC may be configured to write the output data, after encapsulation, into the sender buffers in the second set of sender buffers 476n. In one implementation, the second SmartNIC may be configured to update tail pointers of the sender buffers in the second set of sender buffers 476n in response to the writing of the output data. In one implementation, the second SmartNIC may be configured to process the output data as a payload, apply encapsulation, store it in caches, and stream it to the first SmartNIC over the network fabric 136 (e.g., via a MAC port).

One skilled in the art will appreciate that operations three and four may comprise streaming network packets between the second reconfigurable processor to the second SmartNIC over local PCIe buses using a protocol like Transaction Layer Packet (TLP). One skilled in the art will also appreciate that operation five may comprise streaming network packets from the second SmartNIC to the first SmartNIC over the network fabric 136 (e.g., Ethernet, InfiniBand (IB)) using protocols like RDMA over Converged Ethernet (RoCE), TCP, User Datagram Protocol (UDP), and/or Quick UDP Internet Connections (QUIC).

The receiver buffers in the first set of receiver buffers 478a are configured to provide the output data to the first reconfigurable processor (operation six). In some implementations, operation six is accomplished by an address generator of the first reconfigurable processor (e.g., Address Generation and Coalescing Units (AGCU)) reading the output data from physical memory addresses mapped to the receiver buffers in the first set of receiver buffers 478a (e.g., via a hardware read (HWREAD) command). In one implementation, the second SmartNIC is configured to send the output data to the first SmartNIC in response to the updated tail pointers. In one implementation, the first SmartNIC is configured to write the output data, after decapsulation, into the receiver buffers in the first set of receiver buffers 478a. In one implementation, the first SmartNIC is configured to update tail pointers of the receiver buffers in the first set of receiver buffers 478a in response to the writing of the output data. The first reconfigurable processor is configured to pull the output data from the first SmartNIC (e.g., via the PCIe Endpoint Port (EP)) by reading the output data from the receiver buffers in the first set of receiver buffers 478a in response to the updated tail pointers.

In some implementations, the first reconfigurable processor notifies the second reconfigurable processor of remote invocations using one or more remote procedure calls. In one implementation, the first reconfigurable processor uses the sender buffers in the first set of sender buffers 476a and the receiver buffers in the second set of receiver buffers 478n to send, over the network fabric 136, one or more argument values to the second reconfigurable processor for execution of the remote procedure calls (similar to operation 2).

In some implementations, the second reconfigurable processor notifies the first reconfigurable processor of remote invocations using one or more remote procedure calls. In one implementation, the second reconfigurable processor uses the sender buffers in the second set of sender buffers 476n and the receiver buffers in the first set of receiver buffers 478a to send, over the network fabric 136, one or more argument values to the first reconfigurable processor for execution of the remote procedure calls (similar to operation 5).

Figure 5:
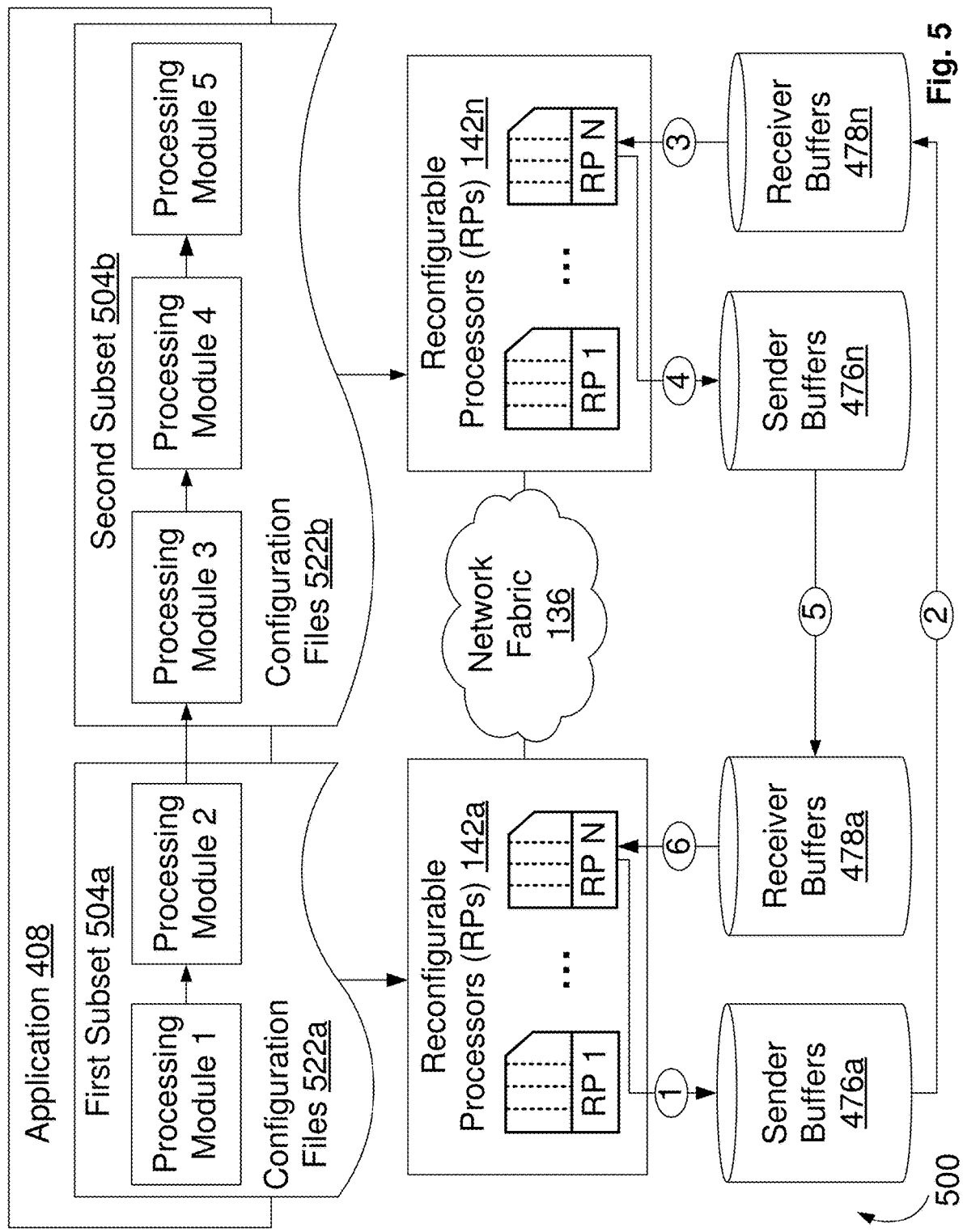
FIG. 5 is a diagram of an illustrative execution of one implementation of an application in parallel using illustrative buffer-based inter-node streaming of configuration data over a network fabric (model parallelism).

FIG. 5 illustrates one implementation of executing 500 an application 408 in parallel using buffer-based inter-node streaming of configuration data (e.g., bit stream) over the network fabric 136. This is referred to herein as "model parallelism."

Illustratively, application 408 may be a dataflow graph with a set of processing modules (e.g., processing modules 1 to 5). Examples of the processing modules include neurons or layers of deep neural networks. A runtime processor may be configured to partition the set of processing modules into a first subset of processing modules 504a and a second subset of processing modules 504b. The runtime processor may be configured to execute first configuration files 522a for the first subset of processing modules 504a (e.g., retrieved from an archive of configuration files) on a first reconfigurable processor (e.g., RP N) of the first reconfigurable processors 142a having a first layout. The runtime processor may be configured to execute second configuration files 522b for the second subset of processing modules 504b (e.g., retrieved from the archive of configuration files) on the second reconfigurable processor (e.g., RP N) of the second reconfigurable processors 142n.

The runtime processor may be configured to use the first plurality of buffers 476a, 478a and the second plurality of buffers 476n, 478n to stream data between the first subset of processing modules 504a and the second subset of processing modules 504b. The data includes feature maps and/or activations generated during a forward pass, and parameter gradients generated during a backward pass.

The operations one to six depicted in FIG. 5 are similar to corresponding operations in FIG. 4.

Figure 6:
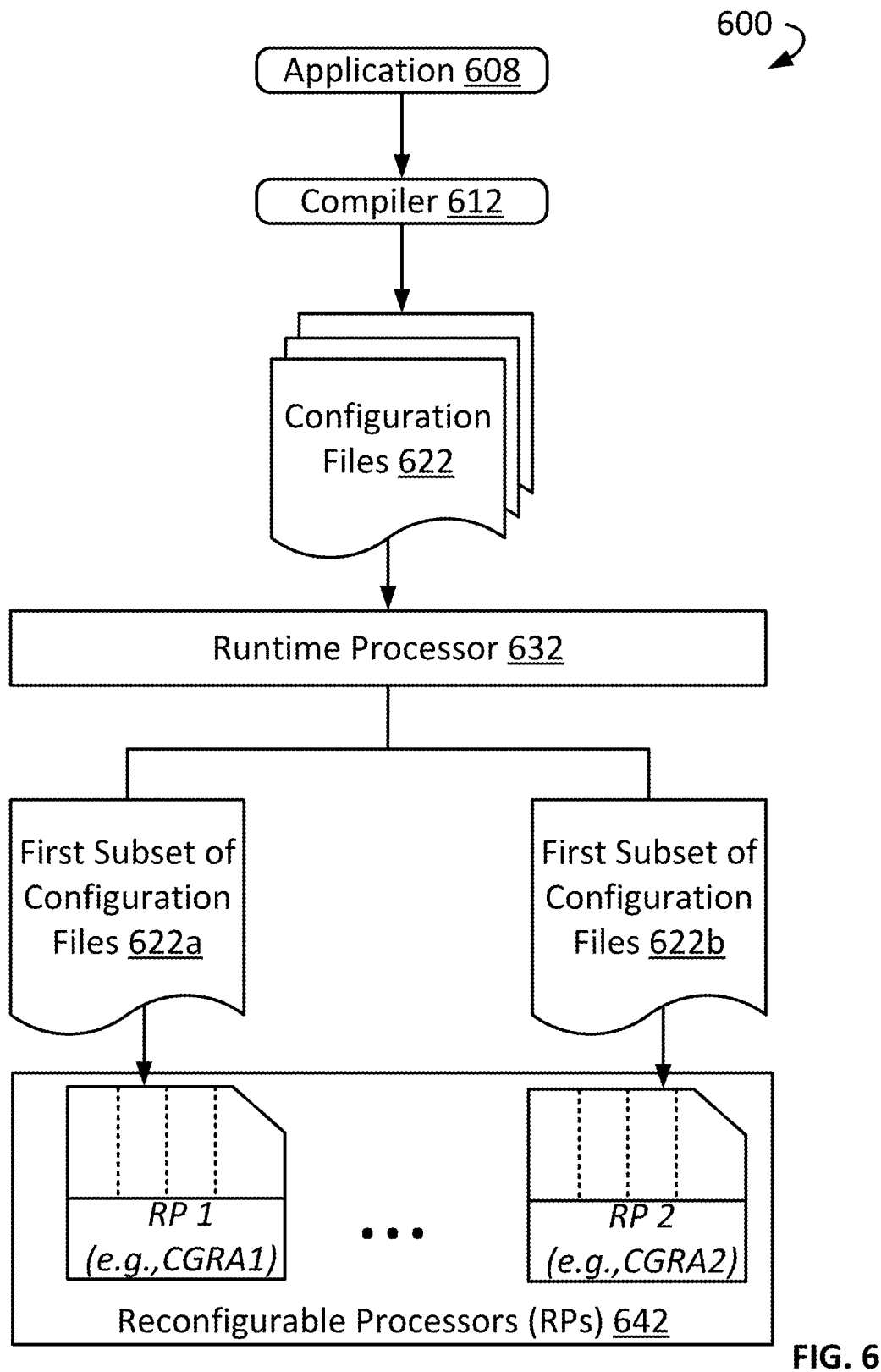
FIG. 6 is a diagram of an illustrative implementation of executing configuration files on heterogeneous reconfigurable processors.

FIG. 6 illustrates one implementation of executing 600 configuration files 622 on heterogeneous reconfigurable processors (e.g., RP 1 and RP 2) 642. In one implementation, the reconfigurable processors 642 are Coarse-Grained Reconfigurable Architectures (CGRAs).

The heterogeneous reconfigurable processors RP1, RP2 may have different levels of coarse-grained configurable granularity (e.g., CGRA1, CGRA2).

The runtime processor 632 is configured to receive a set of configuration files 622 for an application 608 from a compiler 612. The runtime processor 632 is configured to load and execute a first subset of configuration files 622a in the set of configuration files on a first reconfigurable processor (RP 1) in the heterogeneous reconfigurable processors 642. The runtime processor 632 is configured to load and execute a second subset of configuration files 622b in the set of configuration files on a second reconfigurable processor (RP 2) in the heterogeneous reconfigurable processors 642.

The first and second configurations in the first and second subsets of configuration files 622a, 622b have word-level configurable granularities, and the first and second reconfigurable processors RP1, RP2 have a Coarse-Grained Reconfigurable Architecture (CGRA). The first and second configurations both have register transfer-level (RTL) reconfigurability. The first and second configurations use word-wide Issue Slots (ISs)/Arithmetic Logic Units (ALUs)/Functional Units (FUs)/Processing Elements (PEs), Register Files (RFs), and interconnections.

Figure 7:
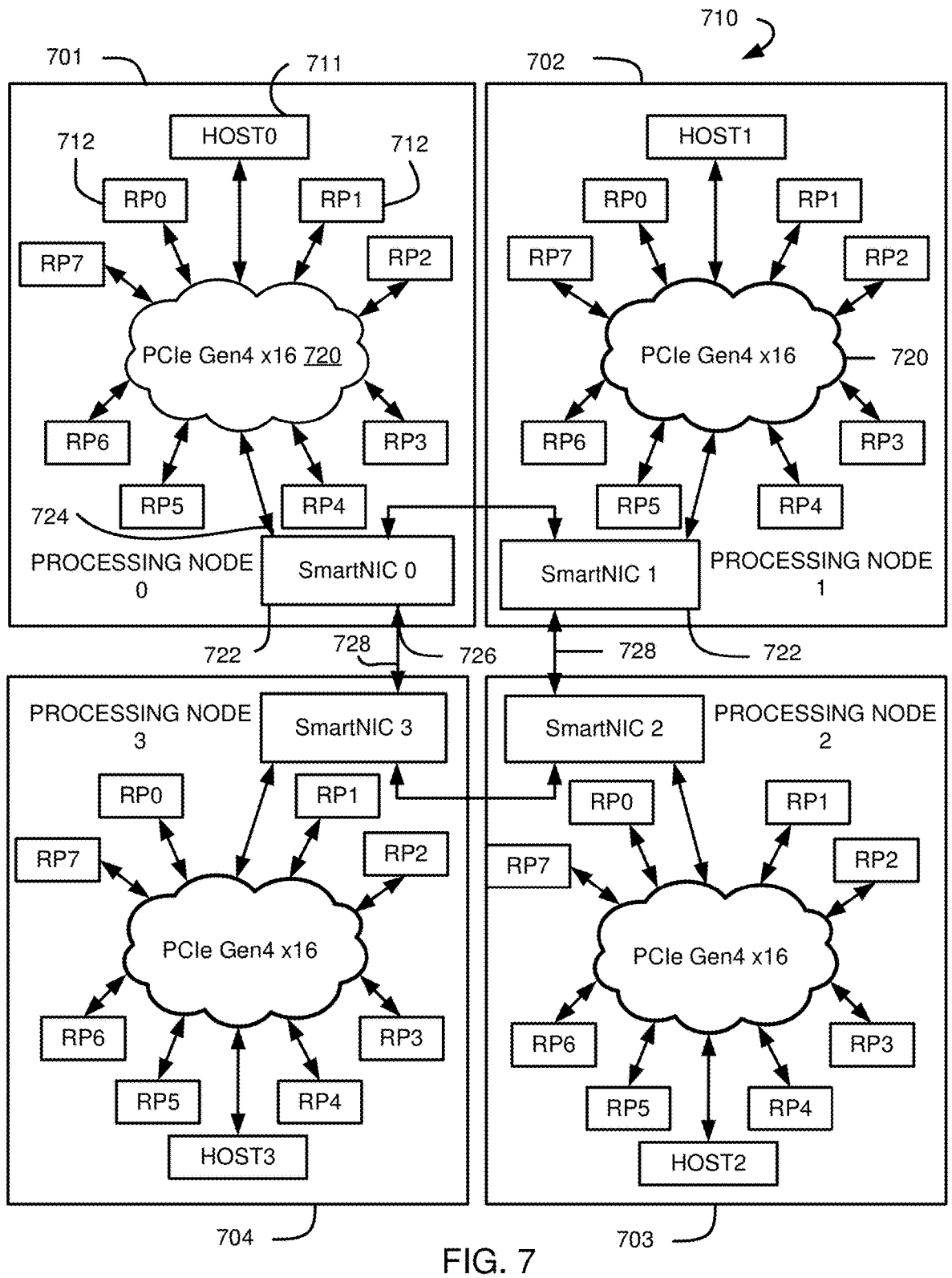
FIG. 7 is a diagram of illustrative data center incorporating multiple processing nodes that communicate with each other over a local area network (LAN) according to the technology disclosed.

FIG. 7 illustrates an example data center 710 incorporating multiple processing nodes. Four processing nodes 701, 702, 703, 704 are shown, numbered 0-3. Each processing node 701, 702, 703, 704 may include a respective host 711 and eight (for example) reconfigurable processors (RPs) 712 numbered RP0 through RP7. The reconfigurable processors RP0 to RP7 may be interconnected by way of a respective PCIe bus 720. If desired, the RPs 712 may be connected via transports other than PCIe bus 720. For example, the RPs 712 may be connected via Ethernet. RPs 712 and other units within a single processing node are sometimes referred to herein as "local" to each other, whereas units that are in different processing nodes are sometimes referred to herein as "foreign" to each other.

The RPs 712 in one processing node (e.g., in local processing node 701) may have a first layout that imposes first constraints for the data-parallel execution of an application, and the RPs 712 in another processing node (e.g., in processing node 702) may have a second layout that imposes second constraints for the data-parallel execution of the application. The first and second layouts may be different, and at least a subset of the first and second constraints may be different.

Illustratively, all reconfigurable processors 712 in a same processing node 701, 702, 703, 704 have the same layout. The corresponding host 711 needs to load the corresponding version of runtime. If desired, a processing node 701, 702, 703, 704 may include at least one reconfigurable processor 712 that has the first layout and another reconfigurable processor 712 that has the second layout.

The hosts 711 are given subscripts in FIG. 7 corresponding to the processing node number to which they belong (e.g. Host0, Host1, Host2 and Host3). Each processing node 701, 702, 703, 704 also includes a respective SmartNIC 722. If desired, one or more of processing nodes 701, 702, 703, 704 may include more than one SmartNIC 722. For example, one or more of processing nodes 701, 702, 703, 704 may include two, three, four, or more SmartNICs. Illustratively, all processing nodes 701, 702, 703, 704 may include a different number of SmartNICs, If desired, at least two processing nodes of processing nodes 701, 702, 703, 704 may include the same number of SmartNICs.

As shown in FIG. 7, each processing node includes a single SmartNIC 722, which has one port 724 connected to the local PCIe bus 720 in the respective processing node, and a second port 726 connected to a LAN 728. Like the hosts 711, the SmartNICs 722 also are given subscripts in FIG. 7 corresponding to the processing node number to which they belong (e.g. SmartNIC0, SmartNIC1, SmartNIC2 and SmartNIC3). However, SmartNICs 722 may be connected in other network topologies, if desired. As an example, the SmartNICs 722 may be connected as a full mesh network. As another example, the SmartNICs 722 may be connected in a network that has the shape of an n-dimensional torus.

The LAN 728 in FIG. 7 is an Ethernet, but in other embodiments it could be other types of LANs such as WiFi or InfiniBand. Also, the LAN 728 could be constructed with various topologies in different embodiments, including all interconnected by a single layer 2 switch. In the embodiment of FIG. 7, however, the LAN 728 is constructed of four separate segments, connected in a ring topology from one SmartNIC 722 to the next. Each of the Ethernet ports 726 in FIG. 7 is considered to have two sub-ports in order to support this topology. Other implementations can have more or fewer sub-ports, as needed given the parameter size relative to minibatch execution time and throughput.

Specifically, SmartNIC0 has one Ethernet sub-port connected to SmartNIC3 and another connected to SmartNIC1; SmartNIC1 has one Ethernet sub-port connected to SmartNIC0 and another connected to SmartNIC2; SmartNIC2 has one Ethernet sub-port connected to SmartNIC1 and another connected to SmartNIC3; and SmartNIC3 has one Ethernet sub-port connected to SmartNIC2 and another connected to SmartNIC0. In order to simplify the discussion, all of the Ethernet segments in FIG. 7 are sometimes referred to herein collectively as a single LAN or Ethernet 728.

The reconfigurable components in all of the processing nodes 701, 702, 703, 704 in the data center 710 are configured by a configuration load process. As an example, one of the hosts 711 acts as the configuration load controller for all processing nodes 701, 702, 703, 704. As another example, each of the hosts 711 may act as the configuration load controller for only those reconfigurable components that reside in its own processing node 701, 702, 703, 704. As yet another example, a separate member, not shown in FIG. 7, acts as the configuration load controller for all of the processing nodes 701, 702, 703, 704.

If desired, each host 711 may access an archive of configuration files that comprises a first configuration file for executing at least a first portion of an application on the first reconfigurable processors 712 in one processing node (e.g., processing node 0 701) and a second configuration file for executing at least a second portion of the application on the second reconfigurable processors 712 in another processing node (e.g., processing node 1 702). Illustratively, each host 711 may include an auto-discovery module that is configured to perform discovery of whether the subset of reconfigurable processors 712 in the respective processing node 701, 702, 703, 704 includes at least one of the first reconfigurable processors and whether the subset of reconfigurable processors includes at least one of the second reconfigurable processors.

Illustratively, a runtime processor is operatively coupled to the reconfigurable processors 712 and allocates a subset of the reconfigurable processors in the first and second processing nodes 701, 702 for executing an application. The runtime processor starts execution of the first and second configuration files in the first and second processing nodes 701, 702 in dependence upon the discovery of the auto-discovery module.

In some implementations, the configuration bit file may designate one of the hosts 711 as a master host, and/or may designate one of the RPs 712 in each processing node 701, 702, 703, 704 as a master RP for that processing node. The configuration bit file may allocate certain high-level responsibilities to such a master RP or master host. In other implementations, the bit file may configure all of the RPs 712 in one or more of the processing nodes to be identical instances of a dataflow graph or graph fragment. In still other implementations, the configuration bit file may configure some or all of the RPs hosts 711 with dissimilar dataflow graphs or graph fragments. The hosts 711, too, may be programmed similarly or differently than the other hosts.

As an example, consider the scenario in which the data center 710 includes first reconfigurable processors 712 having a first layout that imposes first constraints for the data-parallel execution of an application in processing node 701 and second reconfigurable processors 712 having a second layout that imposes second constraints for the data-parallel execution of the application in processing node 702. Consider further that data transfer resources interconnect the first and second reconfigurable processors 712 in the data center and enable the first and second reconfigurable processors 712 to receive and send data between each other. As shown in FIG. 7, the data transfer resources may include LAN 728, PCIe bus 720 and SmartNIC0 722 in processing node 0, and SmartNIC1 722, and PCIe bus 720 in processing node 1.

In this scenario, first and second compilers (e.g., first and second compilers 112a, 112n of FIG. 1) may define respective first and second series of synchronization points in the first and second configuration files.

Illustratively, a first execution of the application on the first reconfigurable processor 712 reaches each synchronization point in the first series of synchronization points in an identical order as a second execution of the application on the second reconfigurable processor 712 reaches a corresponding synchronization point in the second series of synchronization points.

If desired, the first and second reconfigurable processors 712 synchronize compatible data over the data transfer resources 720, 722, 728 only if the first execution of the application on the first reconfigurable processor 712 has reached one of the first series of synchronization points and the second execution of the application on the second reconfigurable processor 712 has reached the corresponding synchronization point in the second series of synchronization points.

Figure 8:
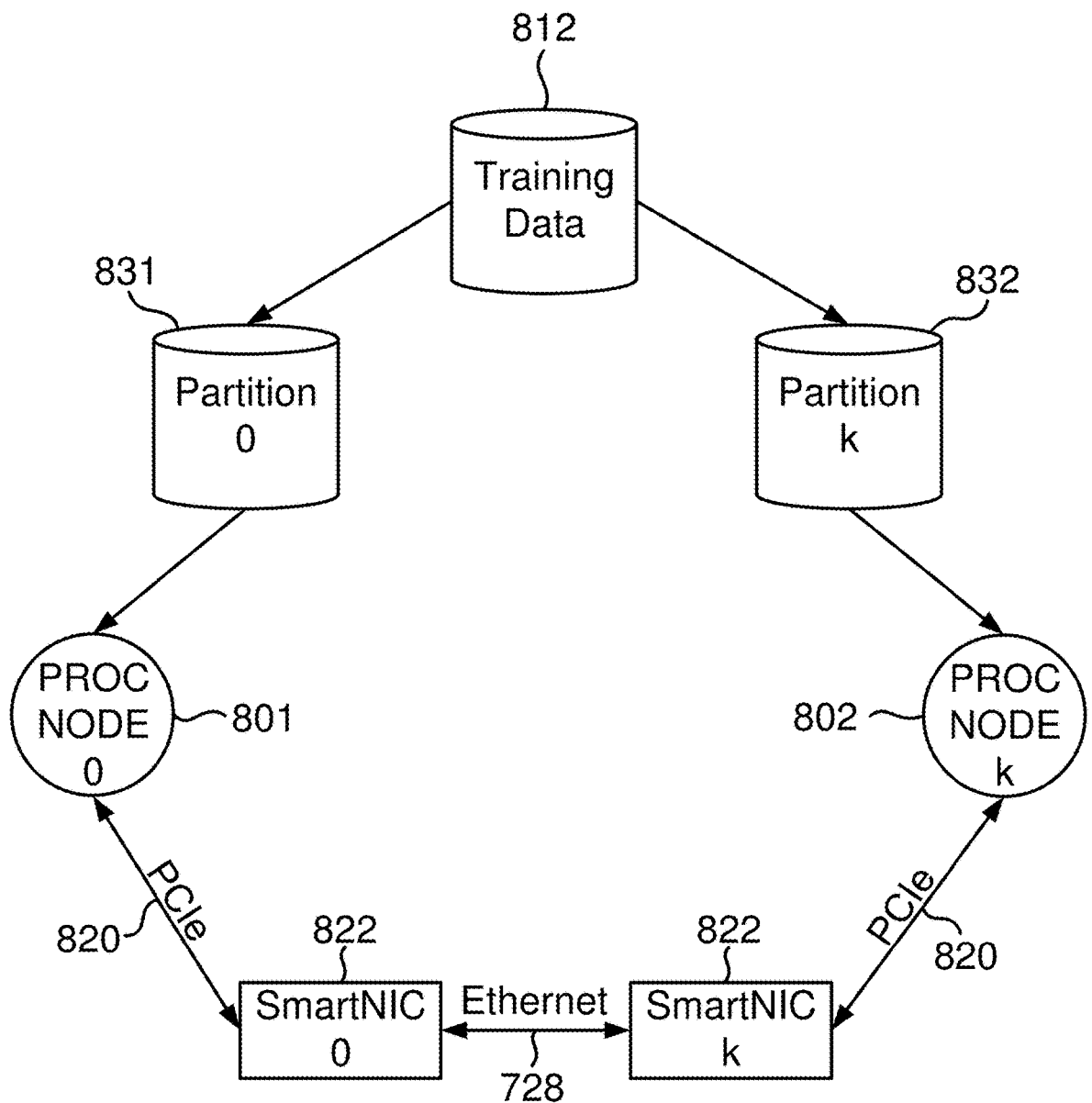
FIG. 8 is a diagram of an illustrative stochastic gradient descent (SGD) deep learning application that is implemented with data parallelism across multiple reconfigurable processors in the multiple processing nodes of FIG. 7.

FIG. 8 illustrates an SGD deep learning application that is implemented with data parallelism across multiple RPs in multiple processing nodes. In particular, the drawing illustrates two processing nodes designated processing node 0 with reference 801 and processing node k with reference 802, where the lower-case subscript 'k' indicates that the component labeled processing node k represents any processing node of multiple processing nodes.

Processing node 0 801 includes first reconfigurable processors having a first layout that imposes first constraints for the data-parallel execution of the application. Processing node k 802 includes second reconfigurable processors having a second layout that imposes second constraints for the data-parallel execution of the SGD deep learning application. The first and second layouts are different, and at least a subset of the first and second constraints is different. For example, the first and second layouts may differ in performance, capacity, connectivity, etc., and configuration files may not be compatible between the first and second reconfigurable processors.

However, to ensure data-parallel compatible execution of the SGD deep learning application, the first and second constraints may ensure that the first and second configuration files generated by first and second compilers respect the following: gradients are computed in the same order, if the compiler groups gradients into contiguous address blocks, the grouping must be the same, gradients do not have to be at the same relative addresses in memory, but gradients must have the same relative address alignment, and any gaps between gradients must be the same size in bytes.

Illustratively, all the RPs in all of the processing nodes 801, 802 (e.g., processing node 0 or processing node k) are configured with the same processing graph fragment, to learn the weights in a multi-layer neural network based on training data 812. The training data 812 has been partitioned into multiple training data sets 831, 832, each to be processed by a respective one of the processing nodes 801, 802 in parallel. Each partition 831, 832 is further divided within a processing node 801, 802 for processing by respective RPs in that processing node.

Each of the SYNC/AR steps of the deep learning application 812 of FIG. 8 includes contributions from all the RPs in all the processing nodes 801, 802. The application 812 may operate by the local SmartNICs 822 each accumulating all gradients from all local RPs to the local SmartNIC's memory, and all the SmartNICs 822 then participating in a Ring All-Reduce process. Note that the All-Reduce process may also be executed on other network topologies. For example, the All-Reduce process may be executed on as a fully-connected mesh network, if the SmartNICs 822 were connected in such a way. Updated weights (or other parameters) are then calculated independently by each of the reconfigurable processors from the resulting average gradients, and broadcast to each SmartNIC's local RPs for use in the next training epoch.

Figure 9:
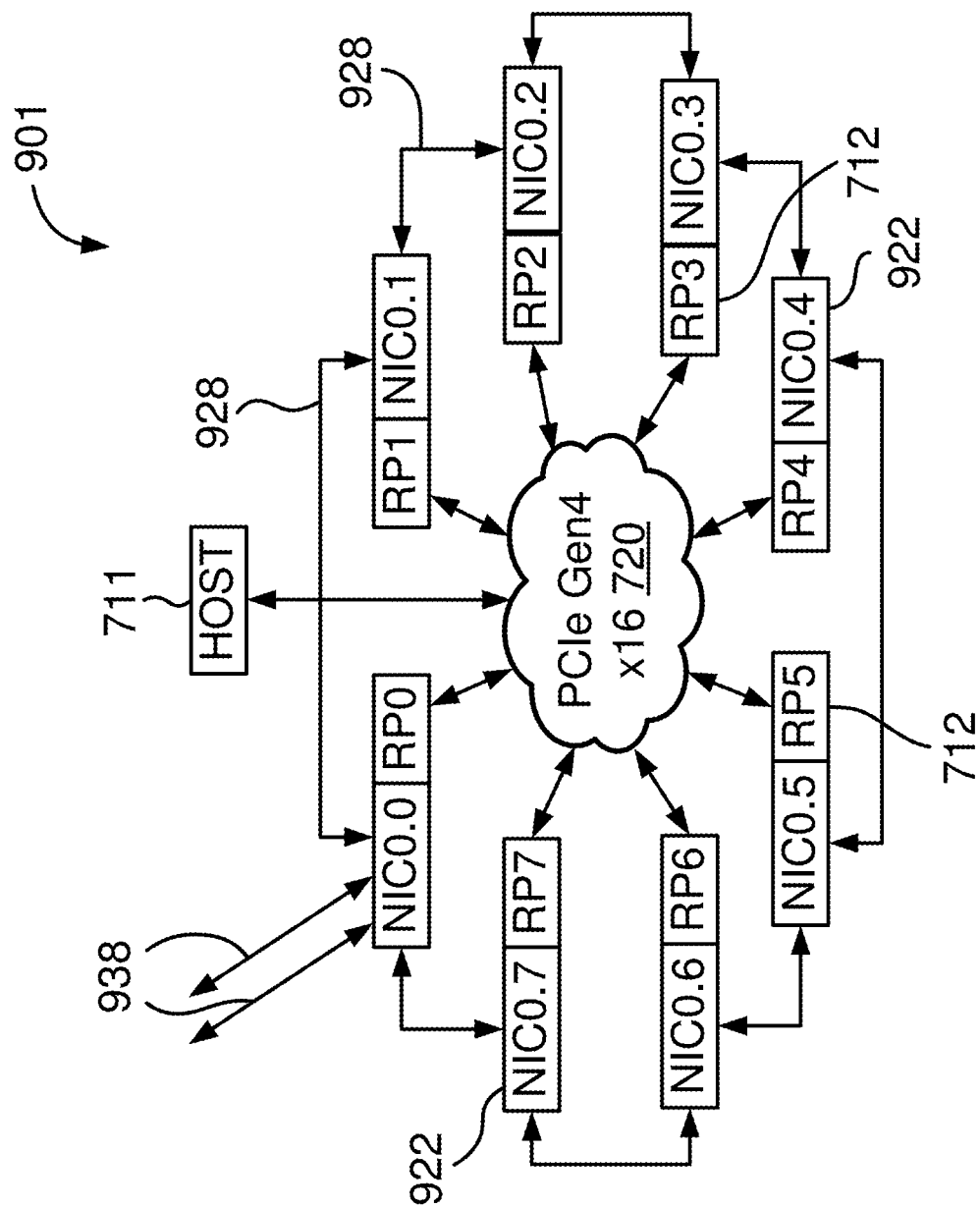
FIG. 9 is a diagram of an illustrative processing node with a host and reconfigurable processors that are interconnected by a peripheral component interconnect express (PCIe) bus.

FIG. 9 illustrates an example processing node 901 which includes a host 711 and eight RPs 712. As shown in FIG. 9, the eight RPs 712 are interconnected by way of a PCIe bus 720. If desired, the eight RPs 712 may be interconnected by way of other suitable transports. For example, the eight RPs 712 may be interconnected by an Ethernet network.

The SmartNICs 922 in FIG. 9 are numbered as "NICk.i, where k is the node number ranging from 0 to N−1, N being the number of participating processing nodes, and where i is the SmartNIC number within the processing node k. The index i ranges from 0 to Mk-1, where Mk is the number of SmartNICs in processing node k.

Only one processing node 901 having node number 0 is shown in FIG. 9, and it will be understood that all of the other participating nodes k, k=1 . . . N−1, can be the same or different (e.g., including reconfigurable processors that have a different layout). Since there are 8 SmartNICs 922 in processing node 901, the SmartNICs 922 are numbered from NIC0.0 to NIC0.7.

Other implementations can include other quantities of RPs 712. Each RP 712 of processing node 901 is paired with its own SmartNICs 922. Each RP 712 communicates with its respective SmartNIC 922 via the PCIe bus 720, though in another embodiment, each RP 712 has a separate, dedicated PCIe bus (or other peripheral bus), separate from PCIe bus 720, for communicating with its respective SmartNIC 922. Each SmartNIC 922 has one port connected to the PCIe bus or any other bus or any other transport such as Ethernet, via which it communicates with its corresponding RP 712, and a second port connected to a local LAN 928. The LAN 928 in the present embodiment is Ethernet, but in other embodiments it could be other types of LANs such as WiFi or InfiniBand.

The SmartNIC 922 labeled NIC0.0 in FIG. 9 may be the one configured by the configuration bit file as the local master SmartNIC. It includes the two additional Ethernet sub-ports 938 for communicating with the local master SmartNICs in the other processing nodes as set forth above with respect to FIG. 7. Alternatively, the LAN 928 (or one segment of the LAN 928) may include an Ethernet switch (not shown) which includes one or more additional ports for extending the LAN 928 to processing nodes other than processing node 901. The arrangement of FIG. 9 can be configured to communicate among the RPs 712 via the two disparate communication link types (PCIe and Ethernet) as needed in order to optimize processing.

Figure 10:
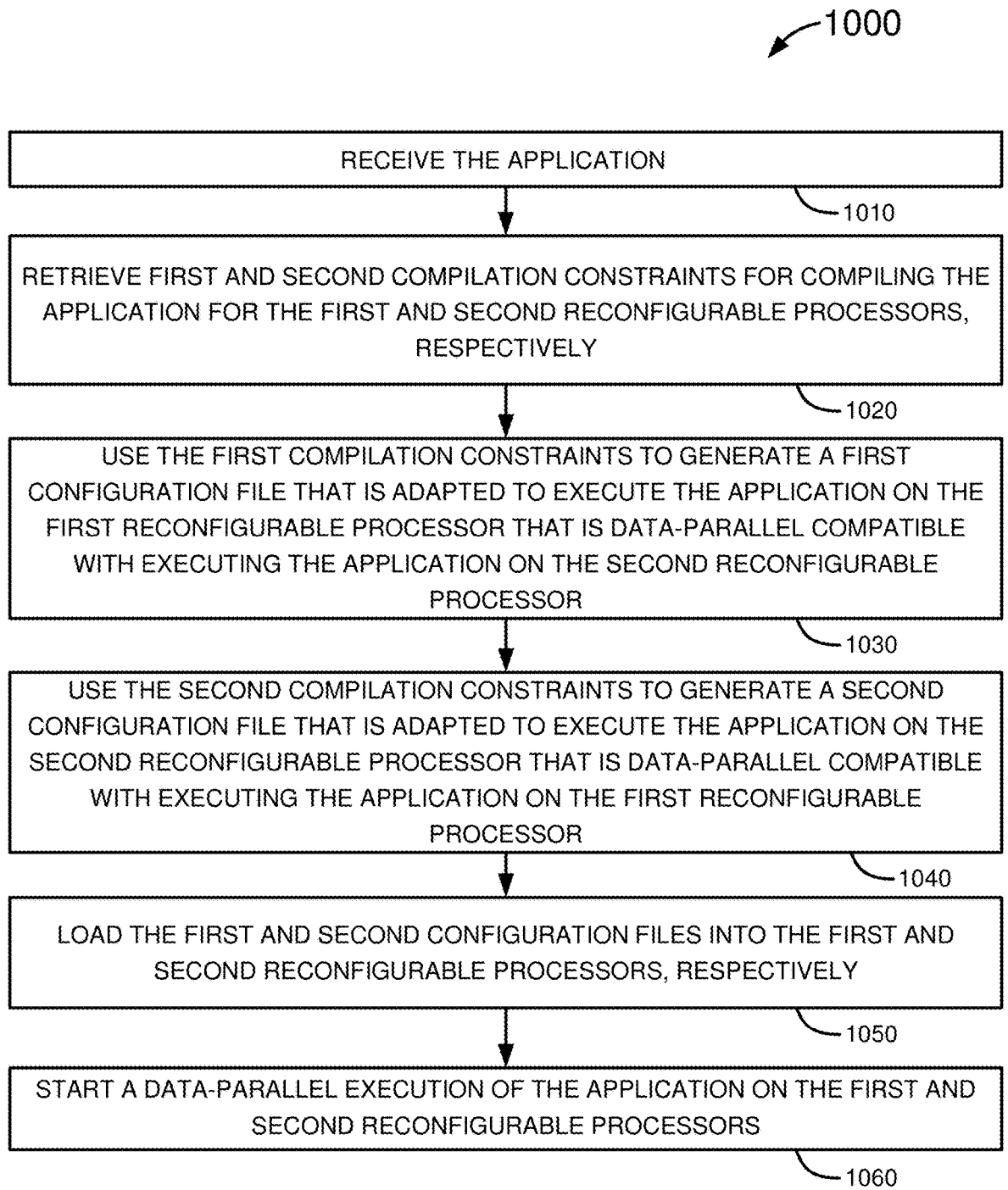
FIG. 10 is a flowchart showing illustrative operations that a system may perform for a data-parallel execution of an application on first and second reconfigurable processors having different layouts.

FIG. 10 is a flowchart showing illustrative operations that a system may perform for a data-parallel execution of an application on first and second reconfigurable processors having different layouts. For example, any one of systems 100 of FIG. 1, 200 of FIG. 2, or 300 of FIG. 3 may perform a data-parallel execution of one of applications 108 on first reconfigurable processors 142a having a first layout and second reconfigurable processors 142n having a second layout.

During operation 1010, the system may receive the application. For example, any one of the systems 100 of FIG. 1, 200 of FIG. 2 or 300 of FIG. 3 may receive applications 108 with deep learning frameworks 114.

During operation 1020, one or more compilers in the system may retrieve first and second compilation constraints for compiling the application for the first and second reconfigurable processors, respectively. As an example, first compiler 112a and second compiler 112n of the system 100 of FIG. 1 may retrieve respective first and second compilation constraints for compiling the application 108 for the first and second reconfigurable processors 142a, 142n from respective first and second runtime logic 122a, 122n. As another example, compiler 248 of system 200 of FIG. 2 or compiler 348 of system 300 of FIG. 3 may retrieve first and second compilation constraints for compiling the application 108 for the first and second reconfigurable processors 142a, 142n as constraints 260 (e.g., from a storage device), respectively.

During operation 1030, a compiler in the system may use the first compilation constraints to generate a first configuration file that is adapted to execute the application on the first reconfigurable processor that is data-parallel compatible with executing the application on the second reconfigurable processor. As an example, compiler 112a of system 100 of FIG. 1 may use the first compilation constraints to generate a first configuration file that is adapted to execute the application 108 on the first reconfigurable processor 142a that is data-parallel compatible with the second reconfigurable processor 142n. As another example, compiler 248 of system 200 of FIG. 2 or compiler 348 of system 300 of FIG. 3 may use the first compilation constraints to generate a first configuration file that is adapted to execute the application 108 on the first reconfigurable processor 142a that is data-parallel compatible with the second reconfigurable processor 142n.

During operation 1040, a compiler may use the second compilation constraints to generate a second configuration file that is adapted to execute the application on the second reconfigurable processor that is data-parallel compatible with executing the application on the first reconfigurable processor. As an example, compiler 112n of system 100 of FIG. 1 may use the second compilation constraints to generate a second configuration file that is adapted to execute the application 108 on the second reconfigurable processor 142n that is data-parallel compatible with the first reconfigurable processor 142a. As another example, compiler 248 of system 200 of FIG. 2 or compiler 348 of system 300 of FIG. 3 may use the second compilation constraints to generate a second configuration file that is adapted to execute the application 108 on the second reconfigurable processor 142n that is data-parallel compatible with the first reconfigurable processor 142a.

During operation 1050, runtime logic in the system may load the first and second configuration files into the first and second reconfigurable processors, respectively. For example, first runtime logic 122a and second runtime logic 122n of any one of the systems 100 of FIG. 1, 200 of FIG. 2 or 300 of FIG. 3 may load the first and second configuration files into the first and second reconfigurable processors 142a, 142n, respectively During operation 1060, the system may start a data-parallel execution of the application on the first and second reconfigurable processors. For example, first runtime logic 122a and second runtime logic 122n of any one of the systems 100 of FIG. 1, 200 of FIG. 2 or 300 of FIG. 3 may start a data-parallel execution of the application 108 on the first and second reconfigurable processors 142a, 142n.

If desired, the system may store the first and second configuration files in an archive of configuration files after the first and second configuration files are generated and retrieve the first and second configuration files from the archive of configuration files before loading the first and second configuration files into the first and second reconfigurable processors, respectively. For example, any one of the systems 100 of FIG. 1, 200 of FIG. 2 or 300 of FIG. 3 may store the first and second configuration files in the archive of configuration files 170 after the first and second configuration files are generated. Hosts 102a and 102n of system 100 of FIG. 1 and hosts 202a and 202n of system 200 of FIG. 2 or of system 300 of FIG. 3 and retrieve the first and second configuration files from the archive of configuration files 170 before loading the first and second configuration files into the first and second reconfigurable processors 142a, 142n, respectively.

Illustratively, the system may use a checker to check enforcement of the first and second compilation constraints in the first and second configuration files.

By way of example, the system may use a checker to check enforcement of the first compilation constraints during the first execution of the application on the first reconfigurable processor and to check enforcement of the second compilation constraints during the second execution of the application on the second reconfigurable processor.

If desired, the system may generate a third configuration file that includes common code that is adapted to be executed on the first and second reconfigurable processors.

Illustratively, the first and second configuration files include respective first and second series of synchronization points, and wherein the data-parallel execution of the application on the first and second reconfigurable processors reaches respective synchronization points in the first and second series of synchronization points in an identical order.

By way of example, the application comprises a neural network stochastic gradient descent training application, whereby using the first compilation constraints to generate the first configuration file and using the second compilation constraints to generate the second configuration file further comprises generating identical first and second groupings of gradients and store the identical first and second groupings of the gradients in respective first and second contiguous address blocks in the first and second configuration files.

In some technologies, the application comprises a neural network stochastic gradient descent training application, whereby using the first compilation constraints to generate a first configuration file and using the second compilation constraints to generate the second configuration file further comprises generating first and second addresses for storing gradients in memory, wherein relative addresses between the first and second addresses are different, and wherein a relative address alignment of the first and second addresses is identical.

If desired, two neighboring addresses for storing a first and a second of the gradients have a same distance between the neighboring addresses.

Figure 11:
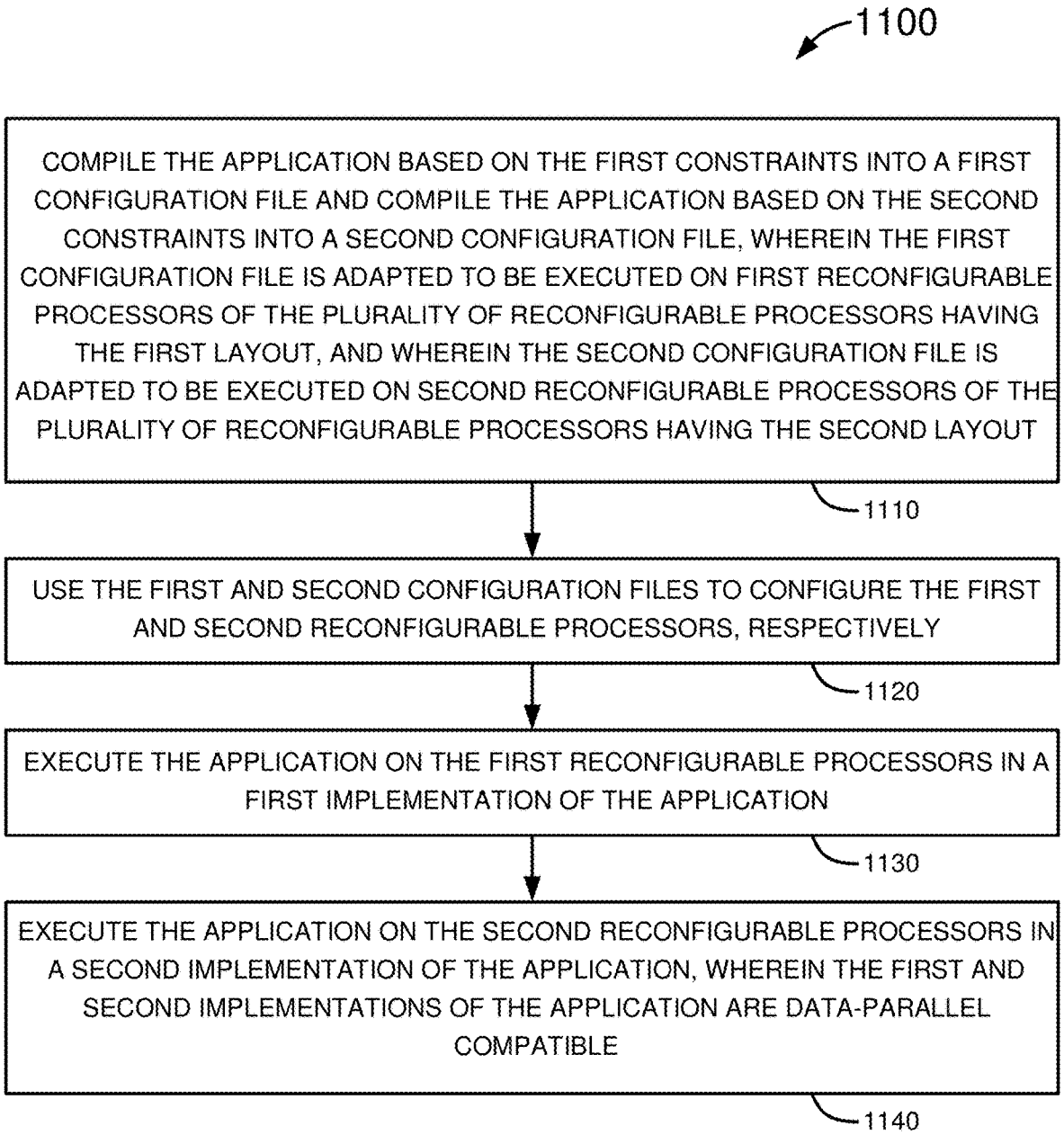
FIG. 11 is a flowchart of an illustrative computer-implemented method for performing data-parallel executions of an application on a reconfigurable computing system.

FIG. 11 is a flowchart of an illustrative computer-implemented method for performing data-parallel executions of an application on a reconfigurable computing system that comprises a plurality of reconfigurable processors having at least first and second layouts, the first layout imposing first constraints for the data-parallel execution of the application and the second layout imposing second constraints for the data-parallel execution of the application, wherein the first and second layouts are different, and wherein at least a subset of the first and second constraints is different, and wherein the reconfigurable computing system further comprises a plurality of data transfer resources that interconnect reconfigurable processors in the plurality of reconfigurable processors and enables the reconfigurable processors in the plurality of reconfigurable processors to receive and send data.

Operation 1110 comprises compiling the application based on the first constraints into a first configuration file and compiling the application based on the second constraints into a second configuration file, wherein the first configuration file is adapted to be executed on first reconfigurable processors of the plurality of reconfigurable processors having the first layout, and wherein the second configuration file is adapted to be executed on second reconfigurable processors of the plurality of reconfigurable processors having the second layout.

Operation 1120 comprises using the first and second configuration files to configure the first and second reconfigurable processors, respectively.

Operation 1130 comprises executing the application on the first reconfigurable processors in a first implementation of the application.

Operation 1140 comprises executing the application on the second reconfigurable processors in a second implementation of the application, wherein the first and second implementations of the application are data-parallel compatible.

Illustratively, the host system may store the first and second configuration files in an archive of configuration files. The host system may retrieve the first and second configuration files from the archive of configuration files prior to using the first and second configuration files to configure the first and second reconfigurable, respectively.

If desired, the computer-implemented method may include checking enforcement of the first and second constraints in the first and second configuration files.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system for a data-parallel execution of at least two implementations of an application on reconfigurable processors with different layouts, comprising:
    a pool of reconfigurable data flow resources that comprises:
        a first reconfigurable processor having a first layout that imposes first constraints for the data-parallel execution of the application,
        a second reconfigurable processor having a second layout that imposes second constraints for the data-parallel execution of the application, wherein the first and second layouts are different, and wherein at least a subset of the first and second constraints is different, and
        data transfer resources that interconnect the first and second reconfigurable processors in the pool of reconfigurable data flow resources and enables the first and second reconfigurable processors to receive and send data between each other;
    an archive of configuration files; and
    a host system that is operatively coupled to the first and second reconfigurable processors and comprises:
        a first compiler that receives the application, generates for the application based on the first constraints a first configuration file, and stores the first configuration file in the archive of configuration files, wherein the first configuration file is adapted to be executed on the first reconfigurable processor and data-parallel compatible with executing the application on the second reconfigurable processor, and
        a second compiler that receives the application, generates for the application based on the second constraints a second configuration file, and stores the second configuration file in the archive of configuration files, wherein the second configuration file is adapted to be executed on the second reconfigurable processor and data-parallel compatible with executing the application on the first reconfigurable processor.

2. The system of claim 1, wherein the host system further comprises:
    a first runtime processor that is operatively coupled to the first reconfigurable processor and configured to: retrieve the first configuration file from the archive of configuration files, load the first configuration file to the first reconfigurable processor, and start a first execution of the application on the first reconfigurable processor in a first implementation of the application, and
    a second runtime processor that is operatively coupled to the second reconfigurable processor and configured to: retrieve the second configuration file from the archive of configuration files, load the second configuration file to the second reconfigurable processor, and start a second execution of the application on the second reconfigurable processor in a second implementation of the application.

3. The system of claim 2, wherein the host system further comprises:
    a first host that comprises the first compiler and the first runtime processor; and
    a second host that comprises the second compiler and the second runtime processor.

4. The system of claim 1, further comprising:
    a third compiler that receives the application, generates for the application a third configuration file, and stores the third configuration file in the archive of configuration files, wherein the third configuration file includes common code that is adapted to be executed on the first and second reconfigurable processors.

5. The system of claim 1, wherein the first and second compilers define respective first and second series of synchronization points in the first and second configuration files.

6. The system of claim 5, wherein a first execution of the application on the first reconfigurable processor reaches each synchronization point in the first series of synchronization points in an identical order as a second execution of the application on the second reconfigurable processor reaches a corresponding synchronization point in the second series of synchronization points.

7. The system of claim 6, wherein the first and second reconfigurable processors synchronize compatible data over the data transfer resources only if the first execution of the application on the first reconfigurable processor has reached one of the first series of synchronization points and the second execution of the application on the second reconfigurable processor has reached the corresponding synchronization point in the second series of synchronization points.

8. The system of claim 1, wherein the data transfer resources include at least one of a peripheral component interconnect express (PCIe) channel, a direct memory access (DMA) channel, a double data rate (DDR) channel, an InfiniBand channel, or an Ethernet channel.

9. The system of claim 1, wherein the application comprises a neural network stochastic gradient descent training application, wherein the first and second compilers generate identical first and second groupings of gradients and store the identical first and second groupings of the gradients in respective first and second contiguous address blocks in the first and second configuration files.

10. The system of claim 1, wherein the application comprises a neural network stochastic gradient descent training application and wherein the first and second compilers generate first and second addresses for storing gradients in memory.

11. The system of claim 10, wherein a relative address alignment of the first and second addresses is identical.

12. The system of claim 10, wherein two neighboring addresses for storing a first and a second of the gradients have a same distance between the neighboring addresses.

13. The system of claim 12, wherein the application comprises a neural network stochastic gradient descent training application, and wherein the first and second reconfigurable processors compute gradients in an identical order.

14. A method of operating a system for a data-parallel execution of an application on first and second reconfigurable processors having respective first and second layouts, comprising:
receiving the application;
retrieving first and second compilation constraints for compiling the application for the first and second reconfigurable processors, respectively, wherein the first compilation constraints are based on the first layout and the second compilation constraints are based on the second layout;
using the first compilation constraints to generate a first configuration file that is adapted to execute the application on the first reconfigurable processor that is data-parallel compatible with executing the application on the second reconfigurable processor;
using the second compilation constraints to generate a second configuration file that is adapted to execute the application on the second reconfigurable processor that is data-parallel compatible with executing the application on the first reconfigurable processor;
loading the first and second configuration files into the first and second reconfigurable processors, respectively; and
starting a data-parallel execution of the application as a first execution on the first reconfigurable processor and a second execution on the second reconfigurable processor.

15. The method of claim 14, further comprising:
storing the first and second configuration files in an archive of configuration files after the first and second configuration files are generated; and
retrieving the first and second configuration files from the archive of configuration files before loading the first and second configuration files into the first and second reconfigurable processors, respectively.

16. The method of claim 14, further comprising:
using a checker to check enforcement of the first and second compilation constraints in the first and second configuration files.

17. The method of claim 14, further comprising:
using a checker to check enforcement of the first compilation constraints during the first execution of the application on the first reconfigurable processor and to check enforcement of the second compilation constraints during the second execution of the application on the second reconfigurable processor.

18. The method of claim 14, further comprising:
generating a third configuration file that includes common code that is adapted to be executed on the first and second reconfigurable processors.

19. The method of claim 14, wherein the first and second configuration files include respective first and second series of synchronization points, and wherein the data-parallel execution of the application on the first and second reconfigurable processors reaches respective synchronization points in the first and second series of synchronization points in an identical order.

20. The method of claim 14, wherein the application comprises a neural network stochastic gradient descent training application, and wherein using the first compilation constraints to generate the first configuration file and using the second compilation constraints to generate the second configuration file further comprises:
generating identical first and second groupings of gradients; and
storing the identical first and second groupings of the gradients in respective first and second contiguous address blocks in the first and second configuration files.

21. The method of claim 14, wherein the application comprises a neural network stochastic gradient descent training application, and wherein using the first compilation constraints to generate a first configuration file and using the second compilation constraints to generate the second configuration file further comprises:
generating first and second addresses for storing gradients in memory, wherein relative addresses between the first and second addresses are different, and wherein a relative address alignment of the first and second addresses is identical.

22. The method of claim 21, wherein two neighboring addresses for storing a first and a second of the gradients have a same distance between the neighboring addresses.

23. A computer-implemented method for performing data-parallel executions of an application on a reconfigurable computing system that comprises a plurality of reconfigurable processors having at least first and second layouts, the first layout imposing first constraints for the data-parallel execution of the application and the second layout imposing second constraints for the data-parallel execution of the application, wherein the first and second layouts are different, and wherein at least a subset of the first and second constraints is different, and wherein the reconfigurable computing system further comprises a plurality of data transfer resources that interconnects reconfigurable processors in the plurality of reconfigurable processors and enables the reconfigurable processors in the plurality of reconfigurable processors to receive and send data, comprising:
compiling the application based on the first constraints into a first configuration file and compiling the application based on the second constraints into a second configuration file, wherein the first configuration file is adapted to be executed on first reconfigurable processors of the plurality of reconfigurable processors having the first layout, and wherein the second configuration file is adapted to be executed on second reconfigurable processors of the plurality of reconfigurable processors having the second layout;

using the first and second configuration files to configure the first and second reconfigurable processors, respectively;

executing the application on the first reconfigurable processors in a first implementation of the application; and executing the application on the second reconfigurable processors in a second implementation of the application, wherein the first and second implementations of the application are data-parallel compatible.

24. The computer-implemented method of claim 23, wherein a host system stores the first and second configuration files in an archive of configuration files, and wherein the host system retrieves the first and second configuration files from the archive of configuration files prior to using the first and second configuration files to configure the first and second reconfigurable processors, respectively.

25. The computer-implemented method of claim 23, further comprising:

checking enforcement of the first and second constraints in the first and second configuration files.

* * * * *